United States Patent
Nakata et al.

(10) Patent No.: US 10,007,975 B2
(45) Date of Patent: Jun. 26, 2018

(54) IMAGE PROCESSING DEVICE AND GUI CONFIGURATION COMMAND METHOD FOR IMAGE PROCESSING DEVICE

(71) Applicant: SONY CORPORATION, Tokyo (JP)

(72) Inventors: Tetsuro Nakata, Kanagawa (JP); Mitsuo Okumura, Tokyo (JP); Jo Wada, Tokyo (JP); Tetsuro Miyazaki, Kanagawa (JP); Kenji Otsuka, Kanagawa (JP); Naomi Egashira, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 391 days.

(21) Appl. No.: 14/759,333

(22) PCT Filed: Mar. 12, 2014

(86) PCT No.: PCT/JP2014/056582
§ 371 (c)(1),
(2) Date: Jul. 6, 2015

(87) PCT Pub. No.: WO2014/142209
PCT Pub. Date: Sep. 18, 2014

(65) Prior Publication Data
US 2015/0356715 A1    Dec. 10, 2015

(30) Foreign Application Priority Data
Mar. 15, 2013    (JP) .................................. 2013-053909

(51) Int. Cl.
*G06F 3/00*      (2006.01)
*G06T 5/50*      (2006.01)
(Continued)

(52) U.S. Cl.
CPC .............. *G06T 5/50* (2013.01); *G06F 1/1616* (2013.01); *G06F 1/1624* (2013.01);
(Continued)

(58) Field of Classification Search
CPC ............. G06T 5/50; G06T 2207/10004; G06T 2207/10; G06F 1/1616; G06F 3/04847;
(Continued)

(56) References Cited

U.S. PATENT DOCUMENTS 5,900,848 A    5/1999  Haneda et al.
7,006,154 B2   2/2006  Dudkowski
(Continued)

FOREIGN PATENT DOCUMENTS

EP    2 551 746 A1    1/2013
JP    2006-53629 A    2/2006
(Continued)

OTHER PUBLICATIONS

International Search Report dated May 13, 2014 in PCT Application PCT/JP2014/056582.
(Continued)

*Primary Examiner* — Jeffrey A Gaffin
*Assistant Examiner* — Ayesha Huertas Torres
(74) *Attorney, Agent, or Firm* — Oblon, McClelland, Maier & Neustadt, L.L.P.

(57) ABSTRACT

There is provided an image processing device including a first housing, a second housing, a first display device, a second display device, a video input terminal, a video output terminal, a storage unit, a video combining unit, a configuration control unit, a first GUI control unit, a second GUI control unit.

13 Claims, 18 Drawing Sheets

(51) Int. Cl.
*G06F 3/0488* (2013.01)
*G06F 3/0484* (2013.01)
*G06F 1/16* (2006.01)
*H04N 5/232* (2006.01)

(52) U.S. Cl.
CPC .......... *G06F 1/1643* (2013.01); *G06F 1/1681* (2013.01); *G06F 1/1692* (2013.01); *G06F 3/0484* (2013.01); *G06F 3/0488* (2013.01); *G06F 3/04847* (2013.01); *H04N 5/23206* (2013.01); *H04N 5/23216* (2013.01); *H04N 5/23296* (2013.01); *G06T 2207/10004* (2013.01); *G06T 2207/10016* (2013.01)

(58) Field of Classification Search
CPC .... G06F 3/0488; G06F 3/0484; G06F 1/1681; G06F 1/1643; G06F 1/1624; G06F 1/1692; H04N 2007/14; H04N 5/23206; H04N 5/23296; H04N 5/23216
See application file for complete search history.

(56) References Cited

U.S. PATENT DOCUMENTS

| | | |
|---|---|---|
| 2002/0171633 A1 | 11/2002 | Brinjes |
| 2006/0034043 A1* | 2/2006 | Hisano ................. G06F 1/1616 361/679.04 |
| 2007/0118815 A1 | 5/2007 | Usui et al. |
| 2007/0229474 A1 | 10/2007 | Okabayashi |
| 2009/0303208 A1 | 12/2009 | Case, Jr. et al. |
| 2010/0103325 A1 | 4/2010 | Maegawa et al. |
| 2012/0194442 A1 | 8/2012 | Sheeley |
| 2012/0194632 A1 | 8/2012 | Sheeley |
| 2012/0198500 A1 | 8/2012 | Sheeley |
| 2013/0027364 A1 | 1/2013 | Kim et al. |
| 2014/0101549 A1 | 4/2014 | Sheeley |
| 2014/0104214 A1 | 4/2014 | Sheeley |

FOREIGN PATENT DOCUMENTS

| | | |
|---|---|---|
| JP | 2007-133680 A | 5/2007 |
| JP | 2008-257432 A | 10/2008 |
| JP | 2009-301034 A | 12/2009 |
| JP | 2010-103960 A | 5/2010 |

OTHER PUBLICATIONS

Extended European Search Report dated Aug. 1, 2016 in Patent Application No. 14762662.6.
European Office Action dated Aug. 10, 2017 in Patent Application No. 14 762 662.6.

* cited by examiner

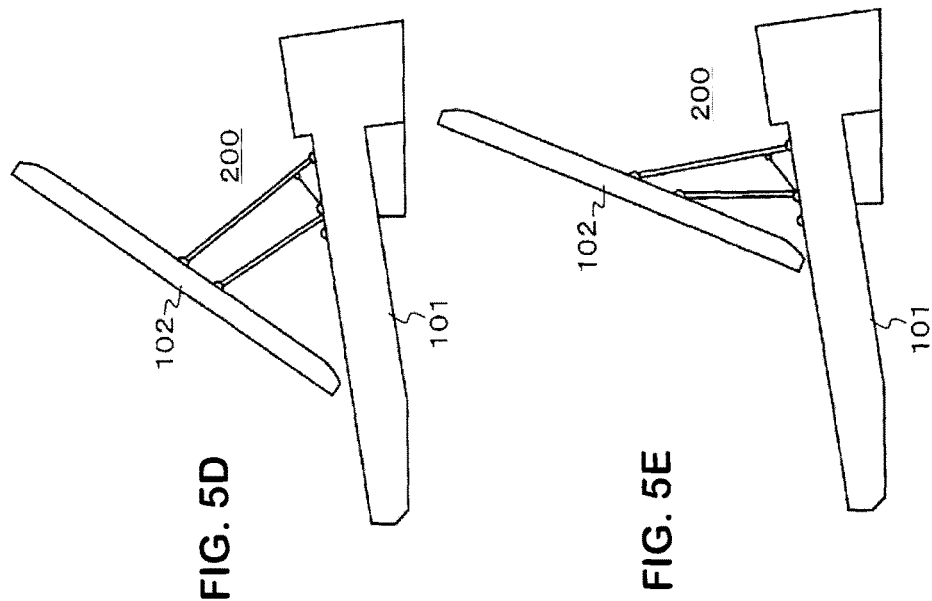
FIG. 5D
FIG. 5E
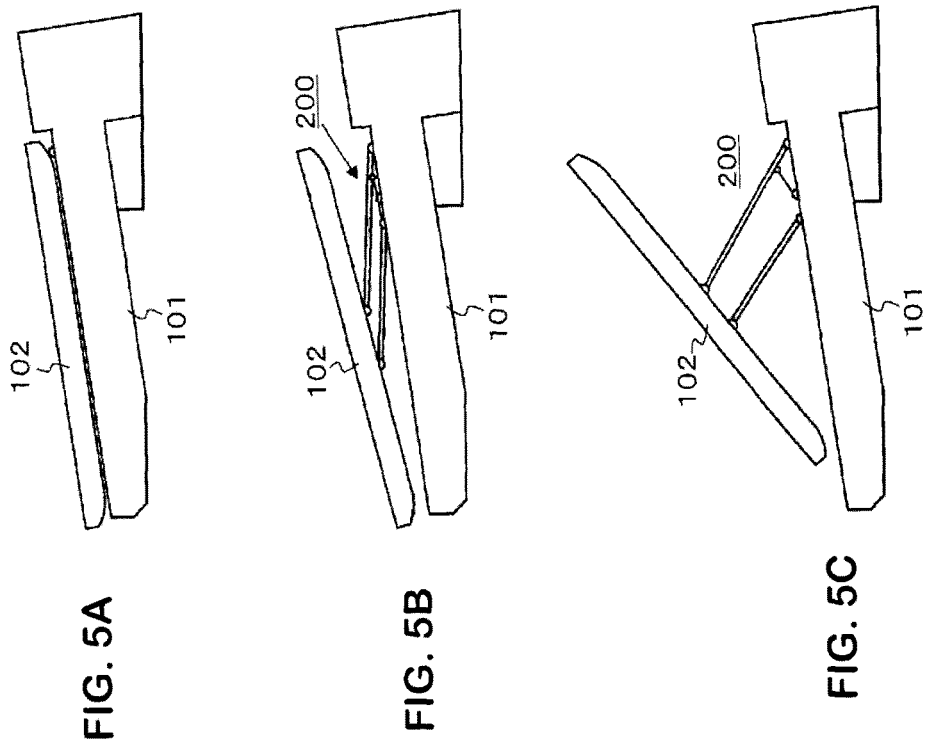
FIG. 5A
FIG. 5B
FIG. 5C

404

IMAGE PROCESSING DEVICE AND GUI CONFIGURATION COMMAND METHOD FOR IMAGE PROCESSING DEVICE

TECHNICAL FIELD

The present technology relates to an image processing device, and a GUI configuration command method for an image processing device. In particular, the present technology relates to an image processing device and the like, the image processing device including first and second display devices capable of a touch input.

BACKGROUND ART

Video switchers (image processing devices) each of which includes a liquid crystal screen and operation units such as fader levers have been conventionally known (see, for example, Patent Literature 1).

CITATION LIST

Patent Literature

Patent Literature 1: U.S. Pat. No. 7,006,154B

SUMMARY OF INVENTION

Technical Problem

It is difficult for beginners who are not familiar with the operation of the video switchers to understand each of the operation units to handle the video switchers.

An object of the present technology is to improve the operability for users.

Solution to Problem

The concept of the present technology resides in an image processing device including: a first housing; a second housing configured to be connected to the first housing; a first display device configured to be attached to a first surface of the first housing, the first display device being capable of a touch input; a second display device configured to be attached to the second housing, the second display device being capable of a touch input; a video input terminal configured to be attached to a second surface of the first housing; a video output terminal configured to be attached to the second surface of the first housing; a storage unit configured to retain a still image; a video combining unit configured to use a video image from the video input terminal and the still image in the storage unit as inputs and to superimpose and combine the video image; a configuration control unit configured to control a configuration state of an output image generated by the video combining unit to be output to the video output terminal; a first GUI control unit configured to provide a GUI function to the first display device; and a second GUI control unit configured to provide a GUI function to the second display device. The second housing is capable of taking a first position at which the second housing is overlaid on the first surface of the first housing and covers the first display device, and a second position at which the second housing rises from the first position and does not cover the first display device, and is capable of moving to transition between the first position and the second position. A plurality of configuration command GUI widgets are disposed and displayed on a display surface of the second display device in a manner that the plurality of configuration command GUI widgets are capable of a touch input, the plurality of configuration command GUI widgets each providing a command of the configuration state of the output image to the configuration control unit. The first GUI control unit includes a table for associating information for commanding a configuration of a GUI displayable on the first display device with a type of the configuration command GUI widget. When a GUI operation input is provided to the configuration command GUI widget, the first GUI control unit references the table to command the first display device about the configuration of the GUI.

According to the present technology, a first housing and a second housing are included. The second housing is connected to the first housing. A first display device capable of a touch input is attached to a first surface of the first housing. A second display device capable of a touch input is attached to the second housing. These first and second display devices are configured of a lamination of an LCD (Liquid Crystal Display) panel and a touch panel, for example. A video input terminal and a video output terminal are attached to a second surface of the first housing.

The second housing can take a first position and a second position, and is capable of moving to transition between the first position and the second position. The second housing is overlaid on the first surface of the first housing, and covers the first display device at the first position. Meanwhile, the second housing rises from the first position, and does not cover the first display device at the second position.

A storage unit retains still image data. For example, the storage unit is configured of an HDD (Hard Disk Drive) or a semiconductor memory. A video combining unit uses a video image from a video input terminal and a still image in the storage unit to superimpose and combine the video image. A configuration control unit controls a configuration state of an output image generated by the video combining unit to be output to the video output terminal. A first GUI (Graphical User Interface) control unit provides a GUI function to the first display device. A second GUI control unit provides a GUI function to the second display device.

A plurality of configuration command GUI widgets each of which provides a command of the configuration state of the output image to the configuration control unit are disposed and displayed on a display surface of the second display device in a manner that the plurality of configuration command GUI widgets are capable of a touch input. For example, the plurality of configuration command GUI widgets are vertically arranged and displayed at an end of the display surface of the second display device in a horizontal direction. Such arrangement allows a user to more smoothly provide a GUI operation input to this configuration command GUI widget. For example, at least one of the plurality of configuration command GUI widgets has a function of providing a command of the configuration state of the output image in a manner that an image which has been associated in advance with this configuration command GUI widget is superimposed.

There is provided a table for associating information for commanding a configuration of a GUI that can be displayed by the first GUI control unit on the first display device with a type of configuration command widget. When the first GUI control unit provides a GUI operation input to the configuration command GUI widget, the table is referenced and the configuration of the GUI is commanded to the first display device. For example, one of the GUI configurations displayable on the first display device may include a GUI for setting a gain value for superimposing an image. One of the GUI configurations displayable on the first display device may include a GUI for setting a position for superimposing an image.

According to the present technology as described above, when a GUI operation input is provided to the configuration command GUI widget disposed and displayed on a surface of the second display device, a table for associating information for commanding configurations of a plurality of GUIs displayable on the first display device with the type of configuration command GUI widget is referenced and a GUI configuration of the first display device is commanded. Accordingly, it becomes possible to dynamically change the GUI configuration of the first display device in accordance with the type of configuration command GUI widget to which a GUI operation input is provided. It is thus possible to cause the first display device to display only a GUI necessary for an operation, thereby improving the operability of users.

According to the present technology, a program image that is an image output from the video output terminal may be displayed on the display surface of the second display device, and a preview image in which a configuration state of an image applicable to the program image is generated without influencing the program image may be displayed. The image processing device may further include an image transition command button attached to the first surface of the first housing, and a transition control unit configured to cause the program image to transition from a present configuration state to a same configuration state as a configuration state of the preview image by pressing down the image transition command button.

In this case, for example, the plurality of configuration command GUI widgets may each provide a command of the configuration state of the preview image to the configuration control unit. In addition, in this case, for example, an image transition command GUI widget having a same function as a function of the image transition command button may be disposed and displayed on the display surface of the second display device.

In addition, in this case, for example, a plurality of image transition type command GUI widgets for setting, before execution, content of a transition function of the program image performed by pressing down the image transition command button may be disposed and displayed on the display surface of the second display device. In addition, in this case, for example, a scene memory GUI widget that operates in a same way as GUI operation inputs are concurrently made to at least one of the configuration command GUI widgets and one of the image transition type command GUI widgets may be disposed and displayed on the display surface of the second display device.

Advantageous Effects of Invention

According to the present technology, it is possible to improve the operability for users.

BRIEF DESCRIPTION OF DRAWINGS

FIGS. 5A-5E are diagrams schematically illustrating a process in which the hinge mechanism allows the second housing to transition between a first position and a second position.

DESCRIPTION OF EMBODIMENTS

An example for implementing the present invention (which will be referred to as "embodiment" below) will be described below. The description will be now made in the following order.
1. Embodiment
2. Modification 1. Embodiment

Figure 1B:
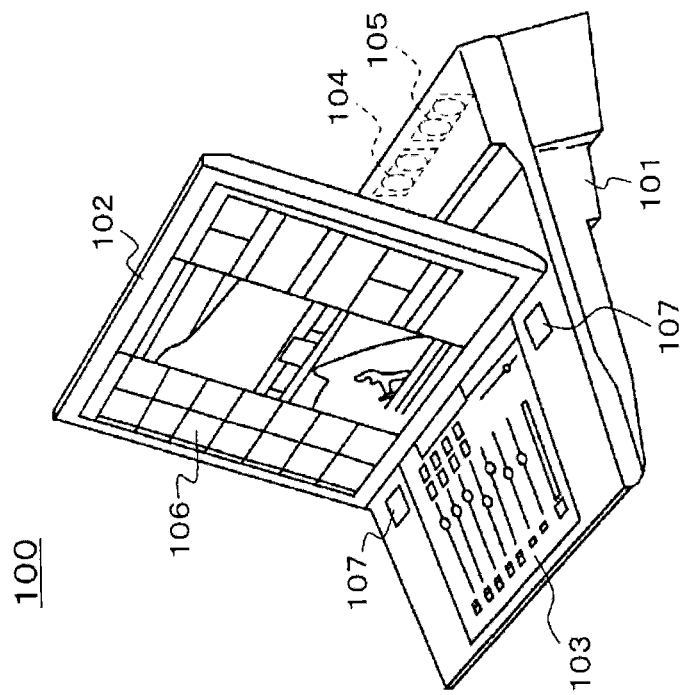
FIGS. 1A, 1B are perspective views illustrating an appearance of an image processing device according to an embodiment.
Figure 1A:
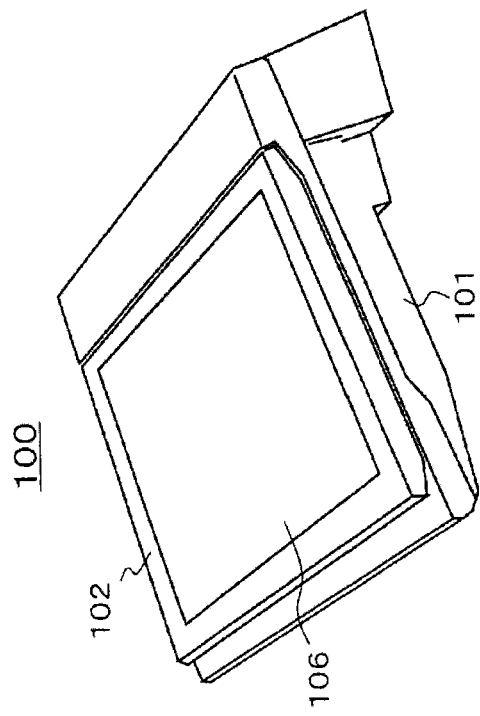

[Configuration of Image Processing Device]
FIGS. 1A and 1B illustrate the appearance of an image processing device 100 according to an embodiment. This image processing device 100 includes a first housing 101 and a second housing 102. A first display device 103 capable of a touch input is attached to the top of the first housing 101. A video input terminal 104 and a video output terminal 105 are attached to the back of this first housing 101. Although not illustrated, an audio input terminal and an audio output terminal are attached to the back of this first housing 101. A second display device 106 capable of a touch input is attached to the top of the second housing 102.

Image transition command buttons (Take Buttons) 107 are attached to both sides of the first display device 103 on the top of first housing 101. The second display device 106 displays a program image (PGM Viewer) above the center and a preview image (NEXT Viewer) below the center. A user can make the program image transition from the present configuration state to the same configuration state as the configuration state of the preview image by pressing down the image transition command button 104.

The second housing 102 can take a first position illustrated in FIG. 1A and a second position illustrated in FIG. 1B, and is capable of moving to transition between the first position and the second position. The second housing 102 is overlaid on the top of the first housing 101 at the first position, and covers the first display device 103. A user can see only the second display device 106 in this state, and can make a touch input only from the second display device 106.

Meanwhile, the second housing 102 rises from the first position, and does not cover the first display device 103 at the second position. A user can see both of the first display device 103 and the second display device 106 in this state, and can make touch inputs from both of these first display device 103 and second display device 106.

Figure 2A:
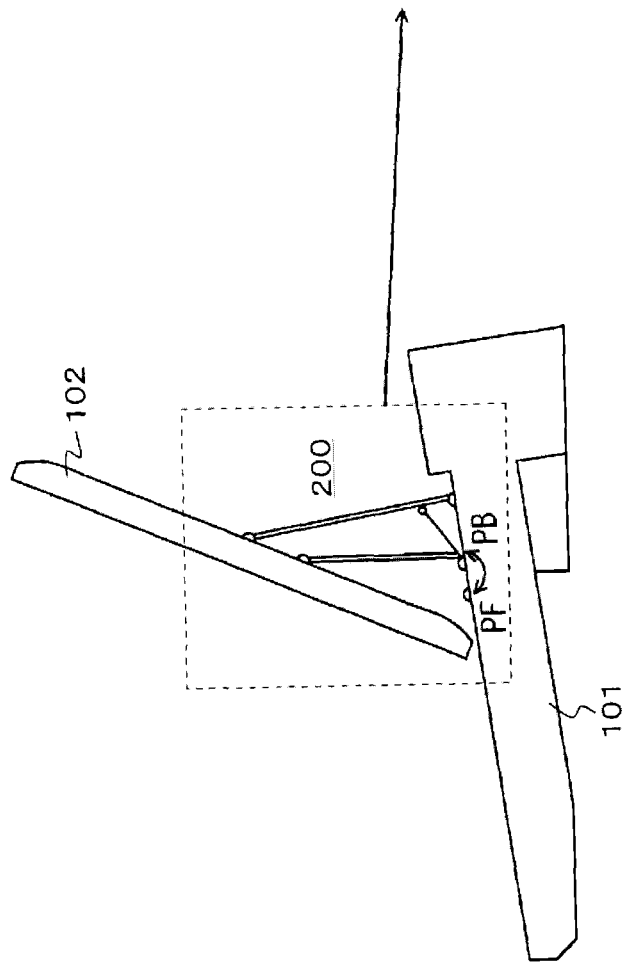
FIGS. 2A, 2B are diagrams for describing that a second housing is connected to a first housing via a hinge mechanism.
Figure 2B:
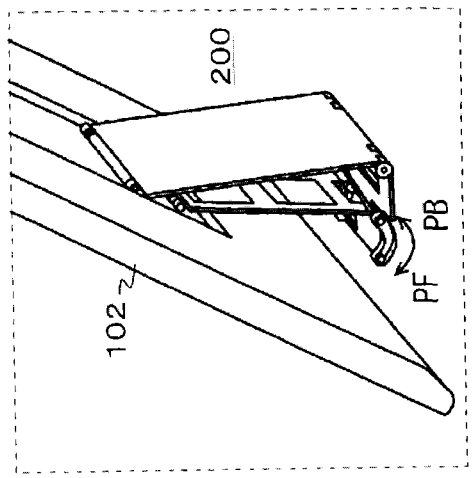
Figure 3B:
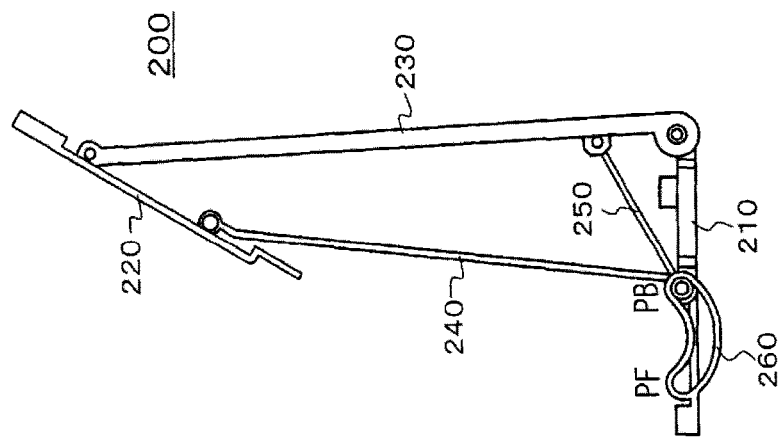
FIGS. 3A, 3B are perspective views and a side view for describing a configuration of the hinge mechanism.
Figure 3A:
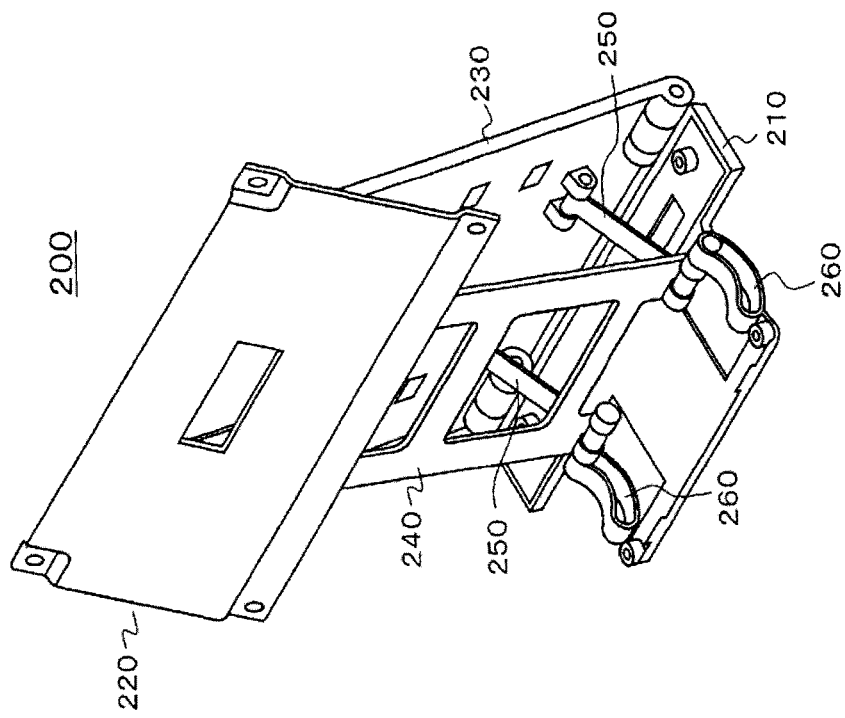

The second housing 102 is connected to the first housing 101 via a hinge mechanism 200 as illustrated in FIG. 2A. FIG. 2B illustrates a perspective view corresponding to a part of FIG. 2A. The hinge mechanism 200 will be described in brief. FIG. 3A illustrates a perspective view of the hinge mechanism 200, while FIG. 3B illustrates a side view of the hinge mechanism 200.

The hinge mechanism 200 includes a bottom fixation unit 210, a housing abutting unit 220, a support unit 230, a first auxiliary unit 240, and second auxiliary units 250. The bottom fixation unit 210 is fixed to a first surface of the first housing 101, for example, with a screw. The housing abutting unit 220 is a substantially rectangular plate member, and is fixed, for example, with a screw, to the second housing 102 on the surface opposite to the attachment surface of the second display device 106.

The support unit 230 is a substantially rectangular plate member that resides between the bottom fixation unit 210 and the housing abutting unit 220. The upper ends of this support unit 230 are rotatably fixed on the upper side of the housing abutting unit 220. Meanwhile, the lower ends of this support unit 230 are rotatably attached to the back ends of the bottom fixation unit 210.

The first auxiliary unit 240 is a substantially rectangular plate member having two quadrangular openings. The upper ends of this first auxiliary unit 240 are rotatably fixed on the lower side of the housing abutting unit 220. Meanwhile, the two second auxiliary units 250 are rod-like members in the right and left directions. The end of the second auxiliary unit 250 is rotatably fixed on the lower side of the support unit 230.

The lower end of the first auxiliary unit 240 is rotatably connected to the other ends of the second auxiliary units 250, and these connected parts are movably inserted into arc-shaped guidance openings 260 formed at the bottom fixation unit 260. These connected parts move to front PF when the second housing 102 is at the first position (see FIG. 1A), while these connected parts move to back PB when the second housing 102 is at the second position (see FIG. 1B).

Figure 4A:
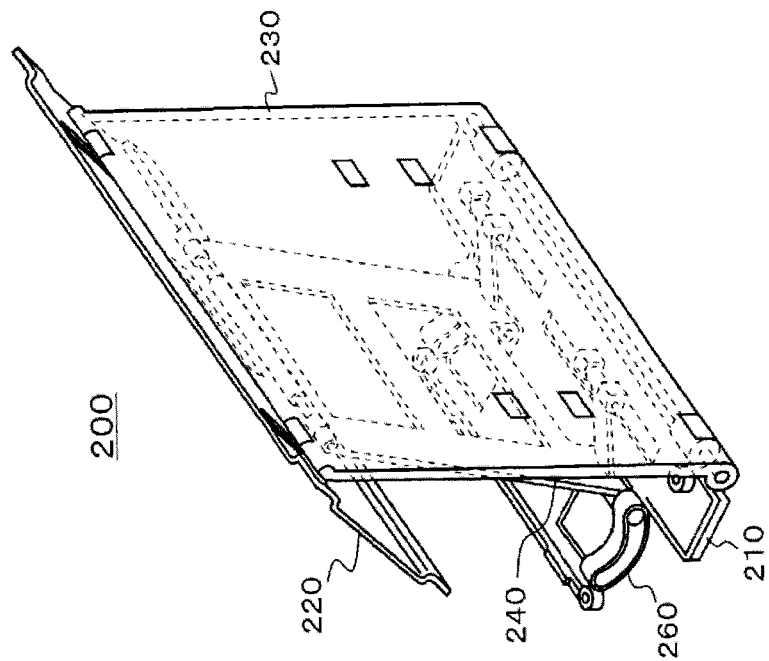
FIGS. 4A, 4B are perspective views showing a back of the hinge mechanism as seen from above, and a perspective view showing the back from a bottom.
Figure 4B:
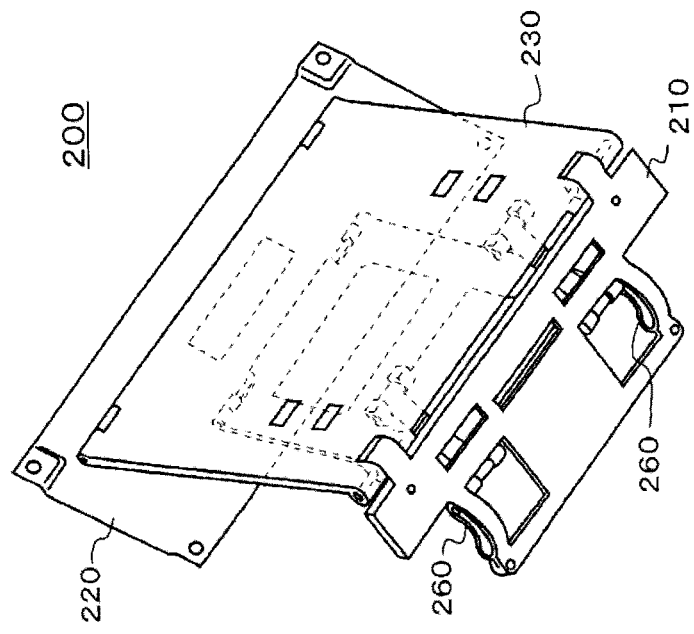

FIG. 4A illustrates a perspective view showing the back of the above-described hinge mechanism 200 as seen from above. Meanwhile, FIG. 4B illustrates a perspective view showing the back of the above-described hinge mechanism 200 as seen from the bottom. The above-described hinge mechanism 200 resides between the first housing 101 and the second housing 102, thereby allowing the second housing 102 to move so as to transition between the first position and the second position.

FIGS. 5A to 5E each schematically illustrate a process in which the hinge mechanism 200 allows the second housing 102 to transition between the first position and the second position. FIG. 5A illustrates that the second housing 102 is at the first position (see FIG. 1A), FIG. 5E illustrates that the second housing 102 is at the second position (see FIG. 1B), and FIGS. 5A to 5D each illustrate that the second housing is between the first position and the second position.

Figure 6:
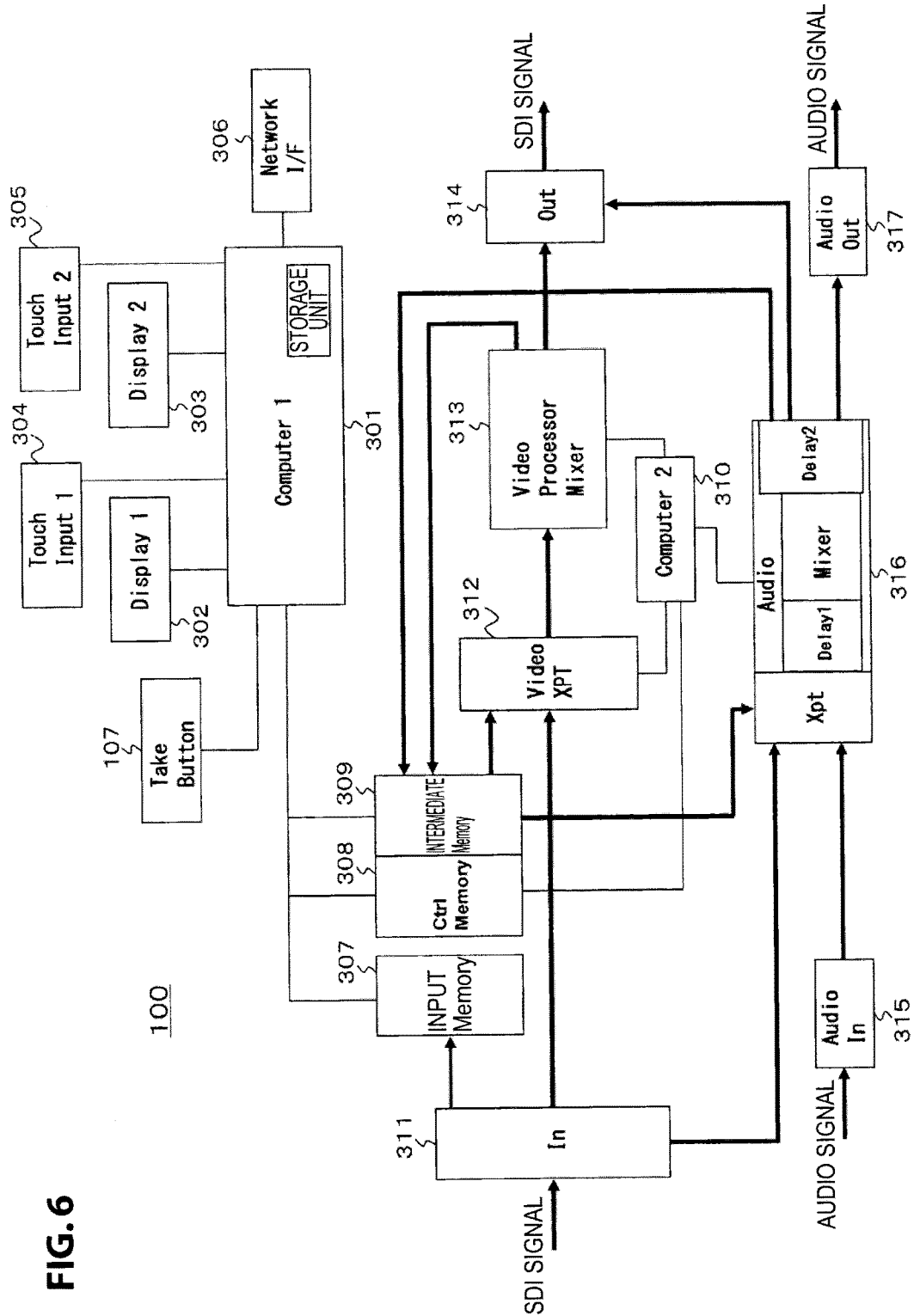
FIG. 6 is a block diagram illustrating an example of a circuit configuration of an image processing device according to an embodiment.

FIG. 6 illustrates an example of a circuit configuration of the image processing device 100. Thick lines in FIG. 6 each represent a signal path of image data or audio data in an internal format or an external format, collectively showing lines through which a plurality of signals flow.

This image processing device 100 includes a first computer 301, displays 302 and 303, touch input units 304 and 305, an image transition command button 107, and a network interface 306. In addition, this image processing device 100 includes an input memory unit 307, a control memory unit 308, and an intermediate memory unit 309.

This image processing device 100 further includes a second computer 310, an image input unit 311, an image switching unit (Video XPT) 312, an image combining unit (Video Processor Mixer) 313, and an image output unit 314. Moreover, this image processing device 100 includes an audio input unit 315, an audio synthesizing unit (Audio Mixer) 316, and an audio output unit 317.

The first computer 301 includes a storage unit such as an HDD (Hard Disk Drive) and a semiconductor memory and the like in addition to a CPU (Central Processing Unit). Connected to this first computer 301 are the displays 302 and 303, and the touch input units 304 and 305. Examples of the displays 302 and 303 include LCDs (Liquid Crystal Displays). The storage unit stores a processing program for the CPU, and retains a still image (such as a title and a logo) to be superimposed on a video image.

Examples of the touch input units 304 and 305 include touch panels, and the touch input units 304 and 305 are laminated on the display surfaces of the displays 302 and 303, respectively. The display 302 and the touch input unit 304 are included in the first display 103 (see FIG. 1(*b*)) capable of a touch input. The display 303 and the touch input unit 305 are included in the second display 106 (see FIGS. 1(*a*) and (*b*)) capable of a touch input.

Connected to the first computer 301 are the image transition command button 107 and the network interface 306. The image transition command button 107 is operated to cause a program image to transition from the present configuration state to the same configuration state as the configuration state of a preview image as discussed above. The network interface 306 is used to connect the image processing device 100 to an external device via a network such as the Internet.

The second computer 310 also includes a storage unit such as an HDD and a semiconductor memory and the like in addition to a CPU in the same way as the above-described first computer 301. Connected to this second computer 310 is no user interface such as a touch input unit. This second computer 310 is connected to the above-described first computer 301 via the control memory unit 308, and is capable of communicating with the first computer 301. This second computer 310 synchronizes each unit of hardware other than the first computer 301 with a vertical synchronizing signal, and controls it.

The input memory unit 307 serves to deliver input image data to the first computer 301. The intermediate memory unit 309 serves as to supply image data and audio data from the first computer 301 to the image switching unit 312 and the audio synthesizing unit 316, and to deliver output image data of the image combining unit 313 and the like to the second computer 301. The first computer 301 accesses the input memory unit 307 and the like via a bus. The contention of access to the input memory unit 307 is controlled by a bus arbiter that is not illustrated.

The image input unit 311 receives inputs of a plurality of SDI (Serial Digital Interface) signals from the outside. This image input unit 311 converts each SDI signal into image data in an internal format and outputs the image data. In addition, this image input unit 311 extracts embedded audio data from each SDI signal and outputs the audio data.

The image switching unit 312 inputs a plurality of image data output from the image input unit 311 and a predetermined number of image data read out from the intermediate memory unit 309, and outputs any image data. That is to say, this image switching unit 312 selects any one of the input image data for each of a plurality of output lines (image data buses), and inputs the selected image data to the image combining unit 313.

This image switching unit 312 is controlled by the second computer 310 to perform switching in a vertical blanking period of image data. The image combining unit 313 uses a plurality of image data output from the image switching unit 312 to combine (Mix) a predetermined number of image data in a superimposing (Superimpose) manner or the like. This image combining unit 313 is controlled by the second computer 310 as with the above-described image switching unit 312. The image switching unit 312 and the image combining unit 313 are included in an effect switcher.

The audio input unit 315 receives inputs of a plurality of audio signals input from a microphone or the like. This audio input unit 315 includes an analog-digital conversion circuit (A/D converter), converts each audio signal from an analog signal to a digital signal, further converts the converted audio signal into audio data in an internal format, and outputs the audio data.

The audio synthesizing unit 316 uses audio data output from the audio input unit 135 and audio data output from the image input unit 311 to synthesize a predetermined number of audio data. The audio synthesizing unit 316 can then exert level control over a plurality of audio data selected from a plurality of input audio data, and synthesize and use them as outputs. In addition, the audio synthesizing unit 136 can carry out a time adjustment on each audio data to be synthesized or carry out a time adjustment on the synthesized audio data. "Delay 1" represents a delay unit that carries out a time adjustment in the former case, while "Delay 2" represents a delay unit that carries out a time adjustment in the latter case.

The audio output unit 317 includes a digital-analog conversion circuit (A/D converter), converts the audio data synthesized by the audio synthesizing unit 316 from a digital signal to an analog signal, and outputs the audio data. These audio systems are controlled by the second computer 310. The image output unit 314 converts the image data combined by the image combining unit 313 into an SDI signal, and outputs the SDI signal to the outside. The image output unit 314 then embeds the audio data output from the audio synthesizing unit 316 into the SDI signal.

The image combining unit 313 makes an SDI output to the outside for the combined image data via the image output unit 314 as discussed above, and concurrently supplies the combined image data to the first computer 301 via the intermediate memory unit 309. This allows the first computer 301 to display an image as a thumbnail image (Widget image) on the display 303 included in the second display device 106. In addition, the first computer 301 displays an image acquired from the input memory unit 307 as a thumbnail image on the display 303 included in the second display device 106.

[Description of Displayed Screen]

The second display device 106 attached to the second housing 102 displays a main (Main) screen for performing an operation such as monitoring (Monitor) and switching a material. Meanwhile, the first display device 103 attached to the first housing 101 displays a sub (Sub)-screen for performing a variety of auxiliary operations in addition to an audio mixer (Audio Mixer) operation. These screens will be described below.

Figure 7:
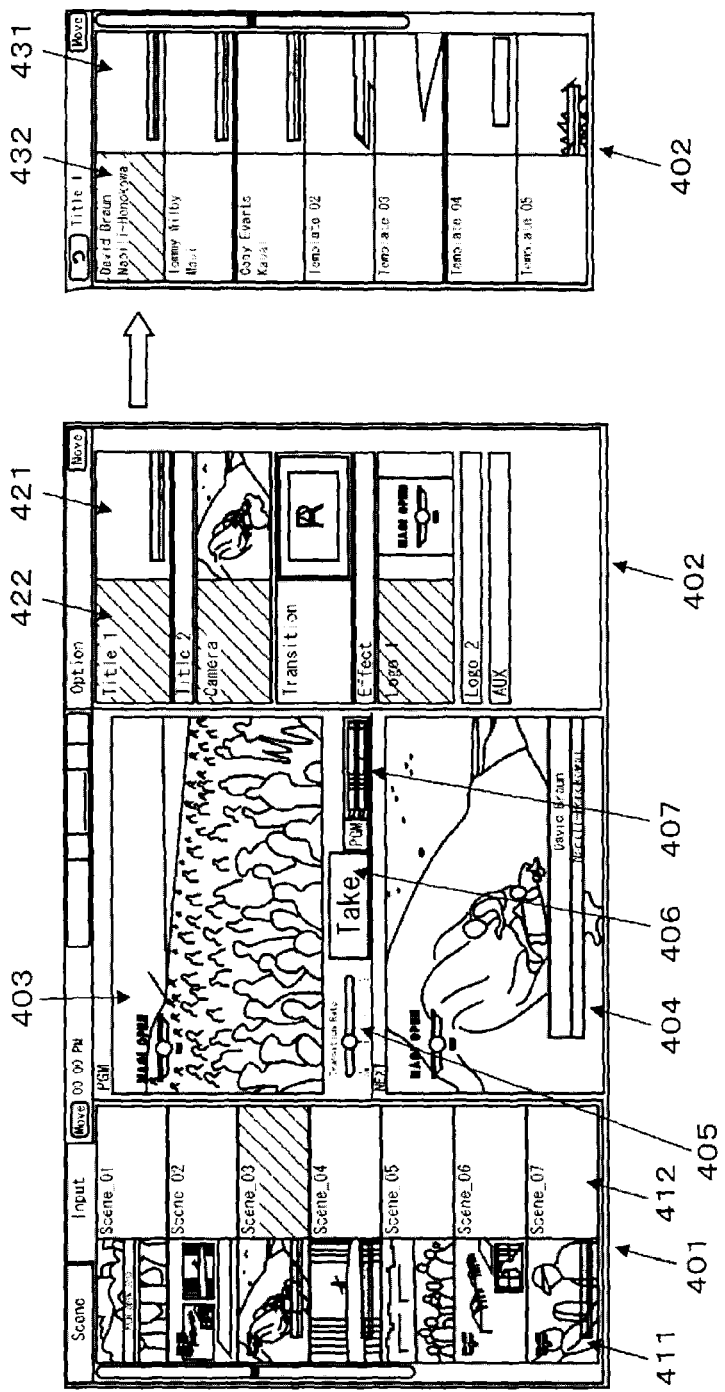
FIGS. 7A, 7B are diagrams illustrating an example of a main screen displayed on a second display device attached to the second housing.

A main screen displayed on the first display device 103 will be described first. FIG. 7A illustrates an example of a main screen displayed on the second display device 106. The screen size of this main screen is, for example, an HD full size of 1920*1080 pixels. A scene/input (Scene/Input) display part 401 is installed on the left side of the main screen. Meanwhile, an option (Option) display part 402 is installed on the right side of the main screen. These display parts 401 and 402 will be discussed below in detail.

In addition, a program viewer (PGM Viewer) 403 is installed above the center of the main screen. This program viewer 403 is a viewer for checking an image subjected to a program output (PGM OUT) or a program image. The size of this program viewer 403 is, for example, a size of 746*420 pixels. A user can set an operation mode to a program direct mode (PGM Direct mode) by tapping (Tap) this program viewer 403.

A scene selected from a list (List) of scenes (Scene) discussed below can be reproduced in a program image with a single operation in this program direct mode, and that program image is displayed on the program viewer 403. A user can cancel this program direct mode by tapping (Tap) the program viewer 403 in this mode.

A next viewer (NEXT Viewer) 404 is installed below the center of the main screen. This next viewer 404 is a viewer for checking, in advance, an image prior to take (Take) or a preview image. The size of this next viewer 404 is, for example, a size of 746*420 pixels.

Figure 8:
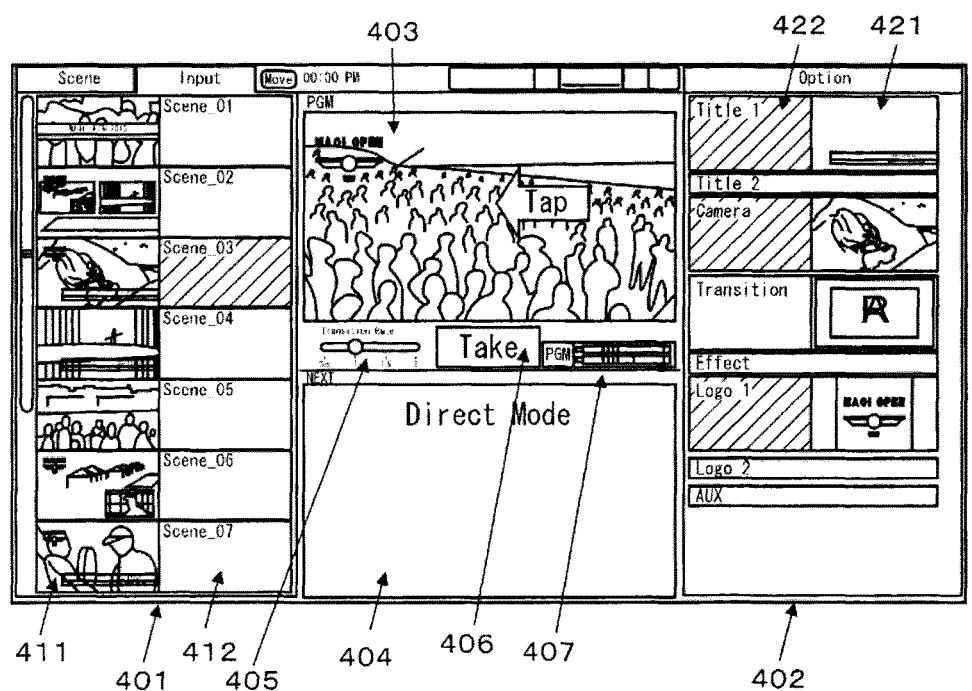
FIG. 8 is a diagram for describing a state of a next viewer or the like with a program direct mode set.

When set to the program direct mode as discussed above, the next viewer 404 is darkly displayed as illustrated in FIG. 8. The next viewer 404 then displays letters such as "Direct Mode" for the convenience of users. Meanwhile, when the program direct mode is canceled, this next viewer 404 is returned to its original brightness and the display of letters is also terminated. Although no image is displayed on the next viewer 404 in FIG. 8, an image is actually displayed darkly.

A transition rate (Transition Rate) 405, a take button (Take Button) 406, and an audio meter (Audio Meter) 407 are displayed in the middle of the center of the main screen. A meter (Meter) switched by an audio mixer (Audio Mixer) of the sub-screen is displayed as the audio meter 407 in association.

The take button 406 is a button operated by a user for taking (Take) a program image to the state of a preview image displayed on the next viewer 404 (i.e. causing the state of the program image to transition) in time set in the transition rate (Transition Rate) 405. This take button 406 is included in an image transition command GUI widget.

This take button 406 has the same function as the function of the image transition command button 107 attached to the top of the above-described first housing 101. A user can select switching operation time by a take operation, for example, from four levels including cut (Cut)/slow (Slow)/middle (Mid)/fast (Fast). The illustrated example shows that slow (Slow) is selected.

When this take (Take) operation is performed, the state of a program image displayed on the program viewer 403 changes into the state of a preview image displayed on the next viewer 404. Additionally, even if this take operation is performed, the display state of the next viewer 404 does not change. That is to say, a program image displayed on the program viewer 403 is equal to a preview image displayed on the next viewer 404 immediately after a take operation is performed.

The scene/input (Scene/Input) display part 401 will be described. A user can switch a list (List) of scenes (Scene) and a list (List) of inputs (Input) by performing a tap (Tap) operation on a desired tab (Tab). The list of inputs is, for example, set by default. The illustrated example shows that the list is switched to the list of scenes.

The list of inputs is a list of image (Video) materials. Each element in the list is a material that is a video input or a file. A user can select a basic image on the basis of the list of inputs. An image material selected from this list is displayed on the next viewer 404 as a preview image. If this input material includes a sound, the audio level can be adjusted in advance in the sub-screen.

The list of scenes is a list of configuration states (scenes) in which a plurality of components such as combined images, synthesized sounds, and the states of a camera (Camera) are registered. A user can select a scene on the basis of the list of scenes. A scene selected from this list is displayed on the next viewer 404 as a preview image. If the above-described program direct mode is set, the selected scene is displayed on the program viewer 403 as a program image. Each list element in the scene list is included in a scene memory GUI widget (Widget).

Whichever of the list of inputs and the list of scenes is displayed here, each list element includes a thumbnail (Thumbnail) display part 411 and a text (Text) display part 412. The thumbnail display part 411 displays thumbnails of an image material and a scene. The size of a thumbnail is, for example, a size of 240*135 pixels. The text display part 412 displays the names of an image material and a scene.

A list element selected by a user with a tap (Tap) operation is different from the other list elements, for example, in the state of the text display part 412 such as colors and patterns, so that it is clarified that the list element selected by a user with a tap operation is selected. The illustrated example shows that a list element of "Scene_03" is selected.

When the list of inputs or the list of scenes is displayed, the respective list elements may be vertically arranged and displayed. Such arrangement allows a user to smoothly select each list element. When the list of inputs is displayed, each list element is included in a configuration command GUI widget (Widget).

The option (Option) display part 402 will be described. The option display part 402 displays the selection button (Option button) of each option as a top menu (Top Menu) by default. The options include a title (Title), a camera (Camera), a transition (Transition), an effect (Effect), a log (Logo), AUX (Aux), and the like.

The selection buttons of the respective options are vertically arranged and displayed. Such arrangement allows a user to smoothly operate each selection button. The selection button of each option is included in the configuration command GUI widget (Widget).

The selection button of each option includes a thumbnail (Thumbnail) display part 421 and a text (Text) display part 422. The text display part 422 displays the name of an option list. Meanwhile, if a material (control option) serving as a list element is selected in an option list discussed below, the thumbnail display part 421 displays a thumbnail of the material. The illustrated example shows that a material is selected with the respective options including a title 1 (Title 1), a camera (Camera), a transition (Transition), and a logo 1 (Logo 1).

If the thumbnail display part 421 displays a thumbnail, a user can operate whether the corresponding material (/control) in the next viewer 404 is displayed/not displayed (applied/not applied), by performing a tap operation on that thumbnail display part 421. For example, if a material is displayed, the state of the text display part 422 such as colors and patterns is different from the state shown when the material is not displayed, so that it is clarified that the material is displayed. The illustrated example shows that the selection materials of the respective options including the title 1 (Title 1), the camera (Camera), and the logo 1 (Logo 1) are displayed.

A user can perform a tap operation on the text display part 422 of a desired selection button to display the option list (Option List) corresponding to the selection button on the option display part 402. A user can select a material on the basis of this option list. If a material has already been selected, it is possible to change or cancel the selection of the material. A user can return the display of the option list to the display of the top menu by performing a tap operation on a return button (Return button).

A user can display the list of the title 1 (Title 1) and the list of a title 2 (Title 2) on the option display part 402 by tapping the selection button of each of the title 1 and the title 2 in the top menu, and can select a desired title as a material. When a predetermined title is selected, the title is superimposed on a preview image displayed on the next viewer 404.

FIG. 7B illustrates a display example of the list of the title 1. Each list element includes a thumbnail (Thumbnail) display part 431 and a text (Text) display part 432. The thumbnail display part 431 displays a thumbnail of a material. The size of a thumbnail is, for example, a size of 240*135 pixels. The text display part 432 displays the name of a material.

A list element selected by a user with a tap (Tap) operation is different from the other list elements, for example, in the state of the text display part 412 such as colors and patterns, so that it is clarified that the list element selected by a user with a tap operation is selected. The illustrated example shows that the first list element is selected. The respective list elements are vertically arranged and displayed. Such arrangement allows a user to smoothly select each list element. Although FIG. 7B illustrates a display example of a title list, the same applies to other option list display, which is not, however, described in detail.

A user can display a list of presets (Preset) of a camera (Camera) selected in the above-described input list on the option display part 402 by performing a tap operation on the selection button of a camera (Camera) in the top menu, and can select a desired preset. When a predetermined preset is selected, that preset is recalled (Recall).

A user can display a list of transition types (Transition Type) on the option display part 402 by tapping the selection button of a transition (Transition) in the top menu, and can select an effect type of a transition to be executed by a take (Take) operation. Each list element in this list is included in a transition type command GUI widget (Widget).

A user can display, on the option display part 402, a list for selecting a type of combination when performing picture-in-picture image combination by tapping the selection button of an effect (Effect), and can select a desired combination type. When a predetermined combination type is selected, a preview image displayed on the next viewer 404 is combined in that combination type.

A user can display the lists of the logo 1 (Logo 1) and the logo 2 (Logo 2) on the option display part 402 by tapping the selection buttons of the logo 1 and the logo 2 in the top menu, and can select a desired logo as a material. When a predetermined logo is selected, the logo is superimposed on a preview image displayed on the next viewer 404.

A user can display a list of materials to be subjected to an AUX output on the option display part 402 by tapping the selection button of AUX (Aux) in the top menu, and can select a desired material. Even if a predetermined material is selected, the material is not displayed on the next viewer 404. However, a user checks the content with thumbnail display of the list.

Next, a sub-screen displayed on the second display device 106 will be described. As discussed above, the sub-screen is a screen for performing a variety of auxiliary operation in addition to an audio mixer (Audio Mixer) operation. The sub-screen displays the tab (Tab) of an auxiliary screen necessary in accordance with an operation on the main screen. The screen size of this sub-screen is, for example, a size of 1280*768 pixels.

The sub-screen constantly displays the tabs (Tab) of an audio mixer (Audio Mixer), streaming (Streaming), recording (Recording), a file manager (File Manager), help (Help), and setup (Set up). In addition, the sub-screen automatically and selectively displays the tabs of an input (Input), a camera (Camera), a title (Title), an effect (Effect), and a logo (Logo) in accordance with an operation on the main screen.

The tab of an input (Input) is displayed on the sub-screen, for example, when a tap (Tap) operation is performed on the tab of an input (Input) in the main screen and the list (List) of inputs (Input) is displayed on the scene/input display part 401. The tab of a camera (Camera) is displayed on the sub-screen, for example, when a tap operation is performed on the selection button of a camera (Camera) displayed on the option display part 402 in the main screen and the list of presets (Preset) of a camera is displayed on this option display part 402. The tab of a title (Title) is displayed on the sub-screen, for example, when a tap operation is performed on the selection button of a title (Title) displayed on the option display part 402 in the main screen and the list of titles is displayed on this option display part 402.

The tab of an effect (Effect) is displayed on the sub-screen, for example, when a tap operation is performed on the selection button of an effect (Effect) displayed on the option display part 402 in the main screen and a list for selecting a type of image combination is displayed on this option display part 402. The tab of a logo (Logo) is displayed on the sub-screen, for example, when a tap operation is performed on the selection button of a logo (Logo) displayed on the option display part 402 in the main screen and the list of logos is displayed on this option display part 402.

An internal storage unit of the first computer 301 stores a table for associating respective operations on the above-described tab and selection button in the main screen with information for commanding a GUI configuration displayable on the first display device 103. When a tap (Tap) operation or a GUI operation input is provided to the above-described tab or selection button in the main screen, the first computer 301 references the table to command the first display device 103 about a GUI configuration. This causes the sub-screen displayed on the first display device 103 to display the tab of an auxiliary screen necessary in accordance with an operation on the main screen.

Figure 9A:
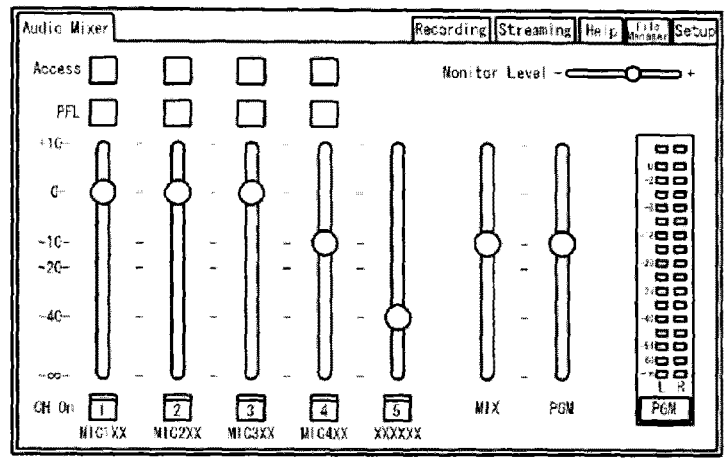
FIGS. 9A-9C are diagrams illustrating a display example of a sub-screen displayed on a first display device.

The sub-screen displayed on the first display device 103 has the tab of an audio mixer (Audio Mixer) subjected to a tap operation by default. That is to say, the sub-screen serves as a setting screen of an audio mixer by this default. FIG. 9A illustrates an example of the setting screen of an audio mixer. Regarding tabs, only the tabs that are always displayed are displayed in the illustrated example.

A user is capable of various kinds of setting regarding an audio mixer such as the level setting of the fader of each channel, the on/off setting of each channel, the setting of a monitor level, and the setting of a monitoring target by using this setting screen of an audio mixer.

Performing a tap operation on the button of access (Access) disposed in an operation screen of an audio mixer displays an access screen as the sub-screen. A user is capable of various kinds of setting such as equalizer setting and filter setting for each channel by using this access screen.

Performing a tap operation on the tab of recording (Recording) displayed on the sub-screen further displays a setting screen of recording as the sub-screen. Although the detailed description will be omitted, a user is capable of various kinds of setting regarding recording by using this setting screen of recording.

Performing a tap operation on the tab of streaming (Streaming) displayed on the sub-screen displays a setting screen of streaming as the sub-screen. Although the detailed description will be omitted, a user is capable of various kinds of setting regarding streaming by using this setting screen of streaming.

Performing a tap operation on the tab of a file manager (File Manager) displayed on the sub-screen displays a setting screen of a file manager as the sub-screen. Although the detailed description will be omitted, a user is capable of various kinds of setting regarding image files and the like by using this setting screen of a file manager.

Performing a tap operation on the tab of setup (Setup) displayed on the sub-screen displays a setting screen of setup as the sub-screen. Although the detailed description will be omitted, a user is capable of various kinds of setting (setup) by using this setting screen of setup.

Figure 9B:
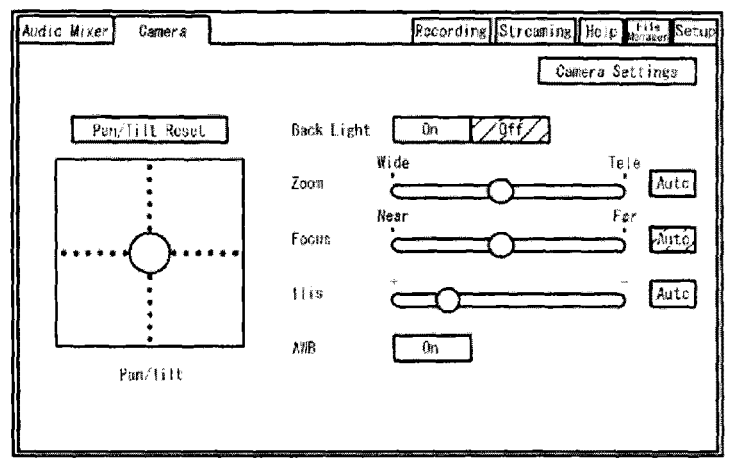
Figure 9C:
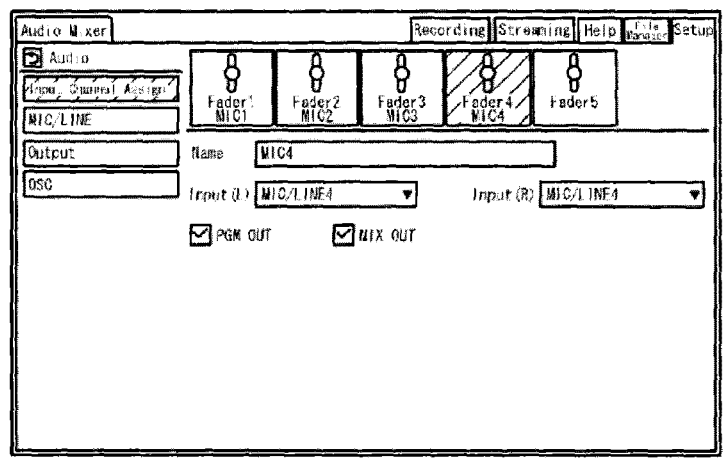

For example, date and time setting, language setting, network setting. video input setting, video output setting, audio input setting, audio output setting, position setting of the program viewer and the next viewer, back light setting of the LCD, rate setting of a transition, or the like. FIG. 9C illustrates an example of the setting screen of setup. The illustrated example shows an audio setting screen and shows that setting regarding "MIC4" is being performed.

Performing a tap operation on the tab of an input (Input) displayed on the sub-screen displays a setting screen of an input as the sub-screen. Although the detailed description will be omitted, a user is capable of setting regarding an input by using this setting screen of an input. Performing a tap operation on the tab of an effect (Effect) displayed on the sub-screen displays a setting screen of an effect as the sub-screen. Although the detailed description will be omitted, a user is capable of setting regarding an effect by using this setting screen of an effect.

Performing a tap operation on the tab of a camera (Camera) displayed on the sub-screen displays a control screen of a camera as the sub-screen. FIG. 9B illustrates an example of the control screen. A user can manually adjust a camera by using this control screen. For example, a user is capable of a pan/tilt adjustment, a zoom/focus/iris adjustment, the on/off setting of a back light correction function, the on/off setting of auto white balance, and the like. The illustrated example shows that the back light correction function is turned off, an automatic adjustment is set for focus, and the auto white balance is turned off.

Performing a tap operation on the tab of a title (Title) displayed on the sub-screen displays a setting screen of a title as the sub-screen. Although the detailed description will be omitted, a user is capable of various kinds of setting regarding a title by using this setting screen of a title. Performing a tap operation on the tab of a logo (Logo) displayed on the sub-screen displays a setting screen of a logo as the sub-screen. Although the detailed description will be omitted, a user is capable of various kinds of setting regarding a logo by using this setting screen of a logo.

Performing a tap operation on an edit box (Edit Box), which is an area (Area) capable of a letter input, in the variety of setting screens superimposes/performs window display on a software keyboard (Software Keyboard) on the sub-screen, allowing for a letter input.

Figure 10:
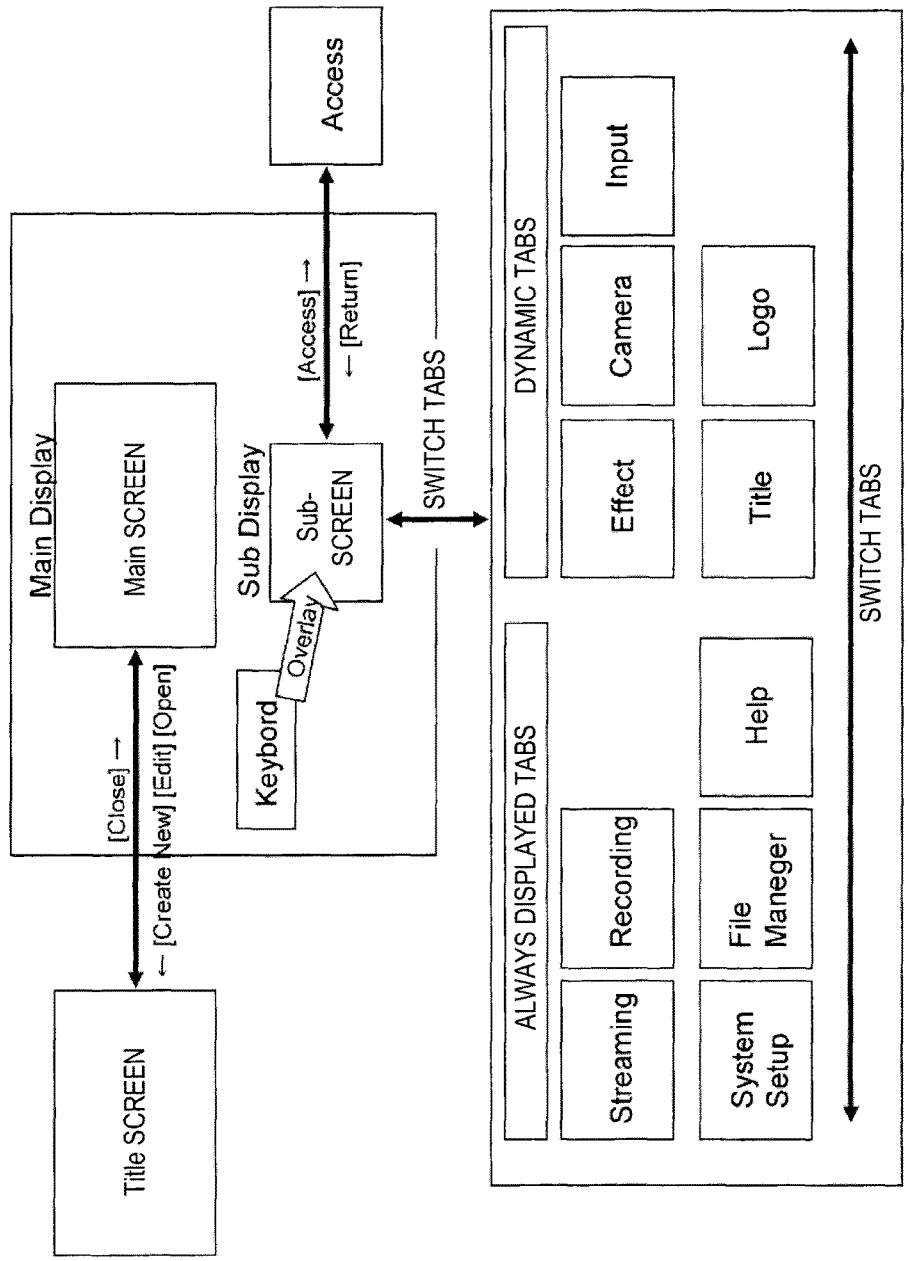
FIG. 10 is a diagram illustrating a main transition between a main (Main) screen and a sub (Sub)-screen.

FIG. 10 illustrates a main transition between the above-described main (Main) screen and sub (Sub)-screen. A tab displayed on the sub-screen allows screen content to be switched. Although the detailed description will be omitted, the second display device 106 serving a main display displays a title screen for generating a title (Title) instead of the main screen when a title is newly generated.

Performing a tap and hold (Tap and Hold) operation on a display area of a list element with a list of titles displayed on the option display part 402 in the main screen of the second display device 106 displays a title screen capable of title editing. Although the detailed description will be omitted, a user can newly generate a title by using this title screen. The title generated here is retained in the storage unit of the first computer 301.

[Description of Scene]

As discussed above, the main screen displayed on the second display device 106 includes the scene/input display part 401, and performing a tap operation on the tab of a scene (Scene) displays a scene list (see FIG. 7A).

A scene (Scene) will be further described. It is possible in the image processing device 100 to perform a setting operation of an image combination configuration or select a title (Title), an effect (Effect), or the like to reflect it on the next viewer 404. For example, the first computer 301 of the image processing device 100 then stores a configuration state generated on the next viewer 404 in the internal storage unit as a scene. Accordingly, if the image processing device 100 calls the scene from the storage unit, the image processing device 100 can reproduce the configuration state of the next viewer 404 even without any setting operation. The image processing device 100 is capable of storing a predetermined number of scenes (up to 99 scenes, for example).

Figure 11:
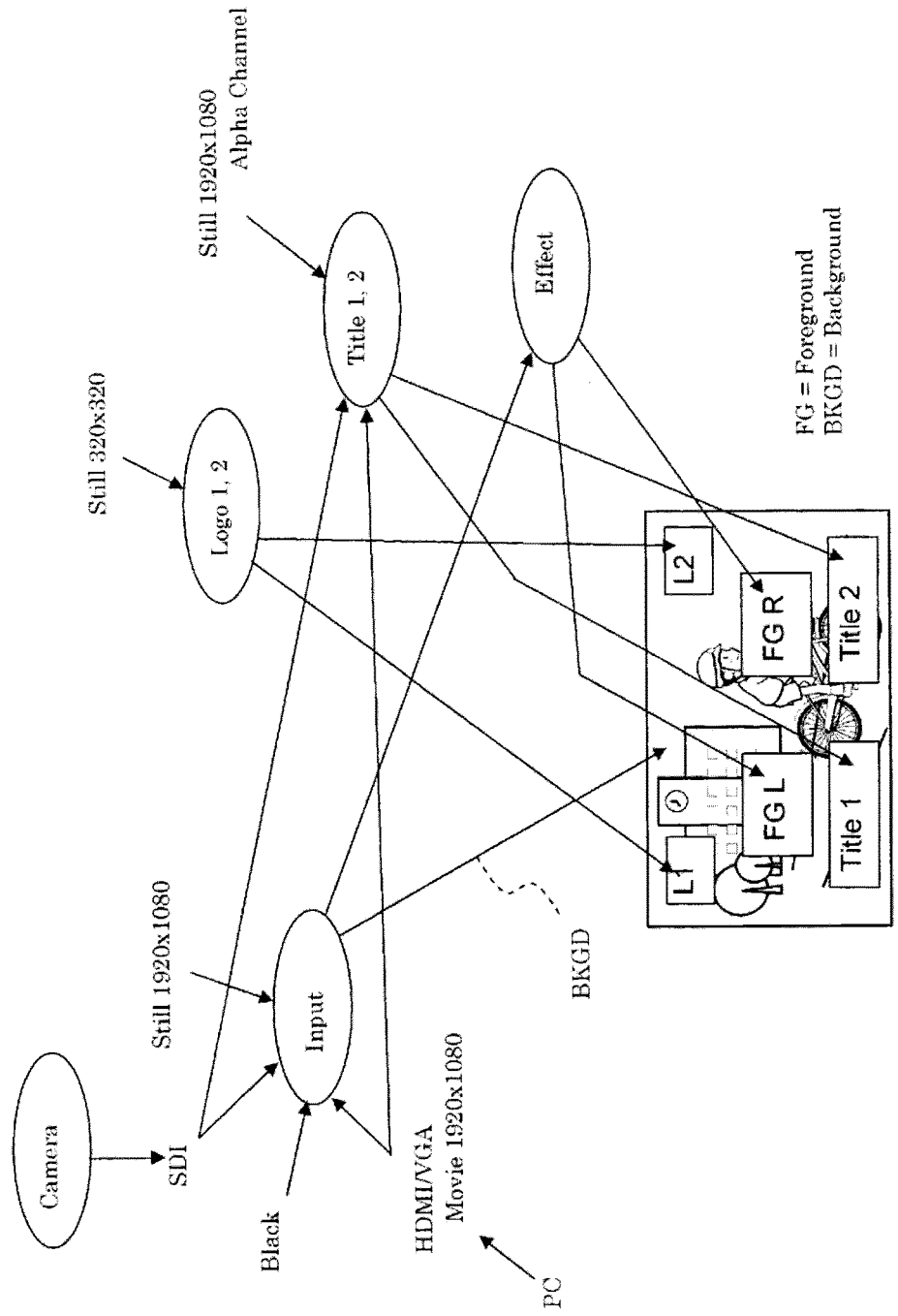
FIG. 11 is a diagram for describing a setup for using a scene.

As illustrated in FIG. 11, a scene is a function for storing the setting regarding the content of "Input," "Title 1, 2," "Log 1, 2," and "Effect." A scene also stores the setting regarding Aux and a transition rate.

The image processing device 100 can reproduce a configuration state of a stored predetermined scene in the next viewer 404 or the program viewer 403 by calling that scene as discussed above.

Figure 12:
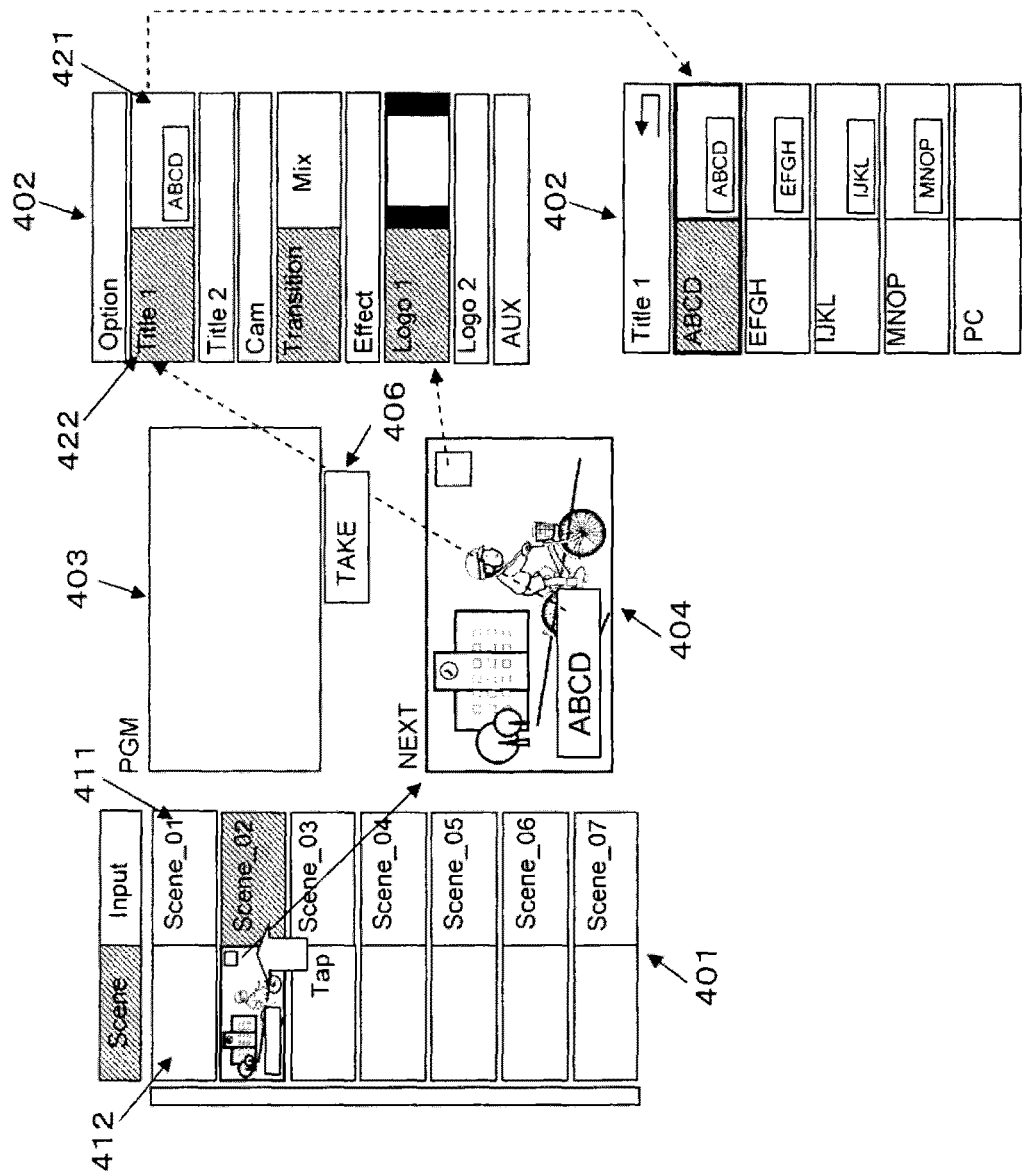
FIG. 12 is a diagram for describing that a scene is called on the next viewer.

Calling for the next viewer 404 will be described with reference to FIG. 12. In this case, a user selects a desired list element and performs a tap operation on its thumbnail display part 411 or text display part 412 with a scene list displayed on the scene/input display part 401.

This keeps the scene corresponding to that list element selected and reproduces the configuration state of that scene in the next viewer 404. The example illustrated in FIG. 12 shows that a scene 2 (Scene 2) is selected.

In this case, the selection button (Option button) of each option displayed on the option display part 402 reflects the configuration state of the next viewer 404. "Title 1" and "Log 1" are used in the illustrated example, and it is shown what is used. In this case, for example, performing a tap (Tap) operation on the text display part 422 of the selection button of "Title 1" displays the list of "Title 1" on the option display part 402. What is being selected is emphasized in this list.

[Description of Title and Logo]

A title and a logo superimposed on an image will be further described. Performing a tap operation on the text display part 422 of the selection button of a title with a top menu (Top Menu) displayed on the option display part 402 (see FIG. 7A) displays a list of selectable titles on the option display part 402 (see FIG. 7B). Although the detailed description will be omitted, candidates that can be selected as a title are assigned to respective list elements in advance through setup.

A desired list element is selected, and a tap operation is performed on the thumbnail (Thumbnail) display part 431 or the text (Text) display part 432, thereby reflecting the title assigned to that list element on image superimposing combination of the next viewer 404. Performing a tap operation on a return button (Return button) when this title list is displayed returns display of an option list to display of the top menu.

When this top menu is displayed, performing a tap operation on the thumbnail (Thumbnail) display part 411 of the selection button of a title executes cancellation (Cancellation) of a title displayed on the next viewer 404. Performing a tap operation on this thumbnail (Thumbnail) display part 411 again displays the title on the next viewer 404 again.

Performing a tap operation on the thumbnail (Thumbnail) display part 411 of the selection button of a title also cancels and re-displays a title displayed on the program viewer 403 in the program direct mode. The description of titles above also applies to logs.

[Adjustment of Title]

Figure 13:
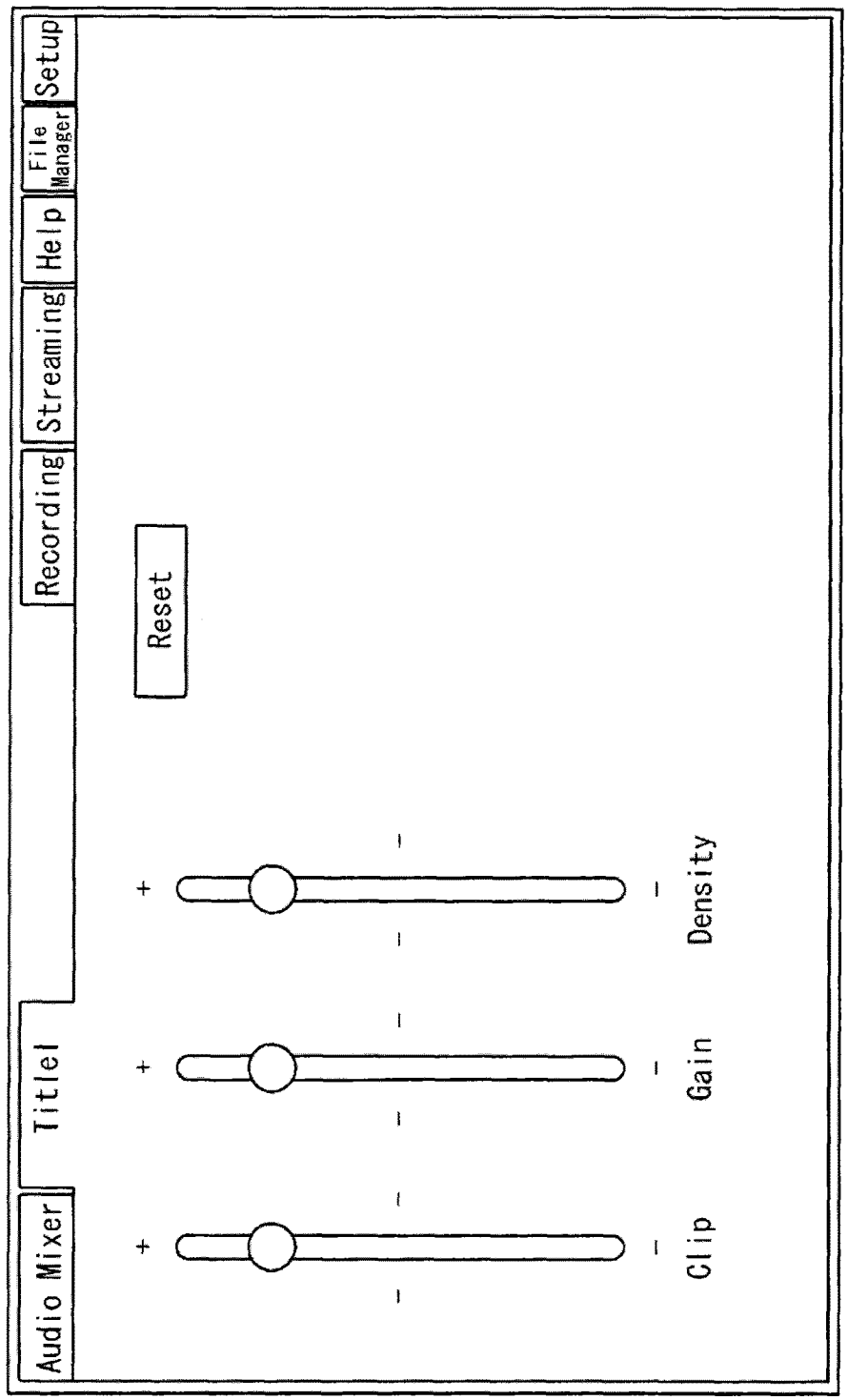
FIG. 13 is a diagram illustrating an example of a setting screen of a title displayed on the first display device as the sub-screen.

Next, an adjustment of a title will be described. As discussed above, the tab of a title is displayed on the sub-screen when a tap operation is performed on the selection button of a title (Title) displayed on the option display part 402 in the main screen and a list of titles is displayed on this option display part 402. Performing a tap operation on this tab of a title then displays a setting screen of a title as the sub-screen. FIG. 13 illustrates an example of the setting screen of a title.

A user is capable of setting three parameters including clip (Clip), gain (Gain), and density (Density) by using this setting screen of a title. For example, clip is adjusted within ranges of 0.00 to 100.00, gain is adjusted within ranges of −100.00 to 100.00, and density is adjusted within ranges of 0.00 to 100.00. This setting screen displays a reset button (Reset Button), and it is possible to reset each setting value. Some setting values of clip, gain, and density do not display any title, but operating the reset button can display the title in that case.

Adjustment parts of clip, gain, and density in the title setting screen in FIG. 13 have round knobs (Knobs) representing the present setting values. Holding and moving the knobs can adjust the parameters. Operating the reset button returns each setting value to the top (Top). For example, the resetting values are clip=0, gain=0, and density=100.

A title is shown without any adjustment for an image showing a letter written in white in the black background because there is a great difference in luminance between black and white. However, no clear title is displayed for an image showing a blue letter written in the black background because blue has low luminance. In that case, the setting value of clip is lowered. List elements arranged in the list of titles with low luminance need clip adjusting. Thus, the setting value of clip is independently stored and retained for each list element.

Density is a parameter for adjusting the transmittance of a title. Adjusting density changes the shade of title display. Note that setting a minimum density value makes a title disappear. The setting value of this density is also individually stored and retained for each list element.

Clip is a parameter for deciding on which level the background (Background) is replaced with the foreground (Foreground). Gain is a parameter for making an adjustment to decide whether to shade off or clarify the edge of a title. Both are functions for minor adjustments, so they are not as important as density.

[Adjustment of Logo]

Figure 14:
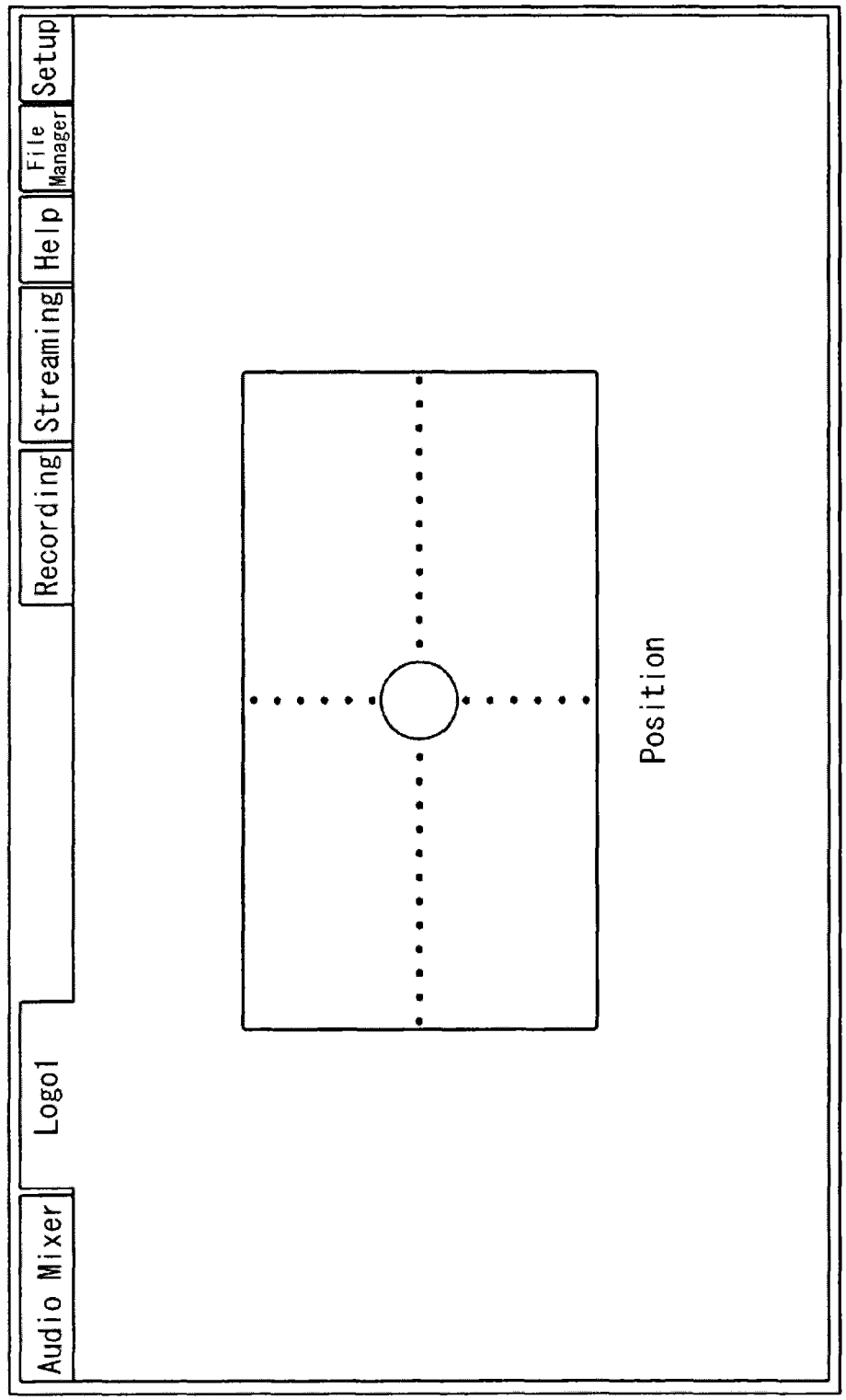
FIG. 14 is a diagram illustrating an example of a setting screen of a logo displayed on the first display device as the sub-screen.

Next, an adjustment of a logo will be described. As discussed above, the tab of a logo (Logo) is displayed on the sub-screen when a tap operation is performed on the selection button of a logo (Logo) displayed on the option display part 402 in the main screen and a list of logos is displayed on this option display part 402. Performing a tap operation on this tab of a logo then displays a setting screen of a logo as the sub-screen. FIG. 14 illustrates an example of the setting screen of a logo.

A user can adjust the display position of a logo by using this setting screen of a logo. A user can adjust the display position of a logo checking the display position of the logo with the next viewer 404. The initial value of the display position of a logo is set to the upper right, so that a round knob (Knob) representing the position is initially displayed at the upper right end. The illustrated example shows that this knob position is adjusted.

Holding and moving the knob can adjust the display position of a logo. Moving the knob in the horizontal direction can change the display position of a logo in the horizontal direction, while moving the knob in the vertical direction can change the display position of a logo in the vertical direction. Here, even moving the knob to the bottom does not make a logo disappear from the screen, and even moving the knob to the left end does not make a logo disappear from the screen. Positional information on a logo is independently stored and retained for each list element.

[Description of Transition]

Next, a transition (Transition) will be described. As discussed above, performing a tap operation on the selection button of a transition in the top menu displays a list of transition types (Transition Type) on the option display part 402. This allows a user to select a type of transition effect attained by performing a take (Take) operation. Additionally, a change in the color of a take button 406 shows that a take operation is being performed.

This selection of type of transition effect designates with what an effect a program image changes (transitions) into a preview image displayed on the next viewer 404 if a tap operation is performed on the take button (Take Button). List display of a transition type is fixed, so that no setting operation of assigning transition types to list elements is necessary in advance. For example, cut (Cut), wipe (Wipe), and mix (Mix) can be set as the transition types. The setting of a transition type is stored in a scene. Once the scene is called, the setting of the transition type is reproduced.

A relationship will be described here between the setting of a transition type and transition effects for a logo (Logo), a title (Title), a foreground (Foreground) (image displayed in picture-in-picture), and a background (Background) (image on which nothing is superimposed). The description will be made for the transition type set to cut. In this case, a transition of cut or instant switching is performed for all of a logo, a title, a foreground, and a background.

Next, the description will be made for the transition type set to wipe or mix. In this case, cut is performed for a logo. Only when a transition makes a foreground or a title disappear or appear, wipe and mix are possible.

If a foreground and a title are displayed on both of the program viewer 403 and the next viewer 404, and their display content is different, cut is performed because wipe and mix are not possible. That is to say, even if wipe or mix is set as the transition type, that type is applicable to a background, but cut is performed for a foreground and a title.

If direct take (Direct Take) is performed, direct take is performed with the set transition type. However, cut alone is performed for a logo, while cut is performed for a foreground and a title in accordance with the above-described conditions.

Direct take is a take operation performed if the above-described program direct mode is set. If a user performs a tap operation on the program viewer 403, the program direct mode (PGM Direct mode) is set (see FIG. 8). In this case, a user selects a desired list element from a scene list displayed on the scene/input display part 401, and a tap operation is performed on its thumbnail display part 411 or text display part 412, which reproduces the scene in the next viewer 404.

The program viewer 403 immediately transitions to the same sate as the state of the next viewer 404 in accordance with the setting of the transition type. The configuration state of the program viewer 404 of a normal video switcher transitions (reverses) to the configuration state of the next viewer 404 with cut, but the next viewer 403 of the image processing device 100 stays in the reproduced scene and does not change. In this case, the next viewer 404 becomes darker and more difficult to watch, but the program viewer displays the same state and a user can watch it. Storage in the scene is also possible.

The speed of a transition or a transition rate (Transition Rate) can be set from, for example, four levels including cut (Cut)/slow (Slow)/middle (Mid)/fast (Fast). It is possible with setup (Setup) to set how long time speed on each level has. For example, cut, slow, middle, and fast transition rates have transition times of 0 seconds, 1 second, 1.5 seconds, and 2 seconds, respectively. The rate value on each level can be set with setup.

The set transition rate is displayed on the main screen. Once the take button is operated, take is executed in this selected time. This selected transition rate is stored in the scene, and reproduced if the scene is called. If direct take is executed, direct take is executed at the selected transition rate.

[Camera Operation]

Next, a camera operation in the image processing device 100 will be described. The overview of the camera operation includes (1) selecting one camera image from a plurality of camera images and displaying the selected camera image on the next viewer 404 or the program viewer 403, (2) manually adjusting the camera, and (3) storing a result of the adjustment in a preset of a camera and reusing the result, and the like.

The following are prerequisites of this camera operation. That is to say, (1) setup decides a relationship between an input connector (video input terminal) and a camera, (2) the setting of a video system control architecture (VISCA) is performed on a camera to be subjected to remote (Remote) control, (3) an input including a camera is assigned to each list element in an input list displayed on the scene/input display part 401 in the main screen, and the like.

Figure 15:
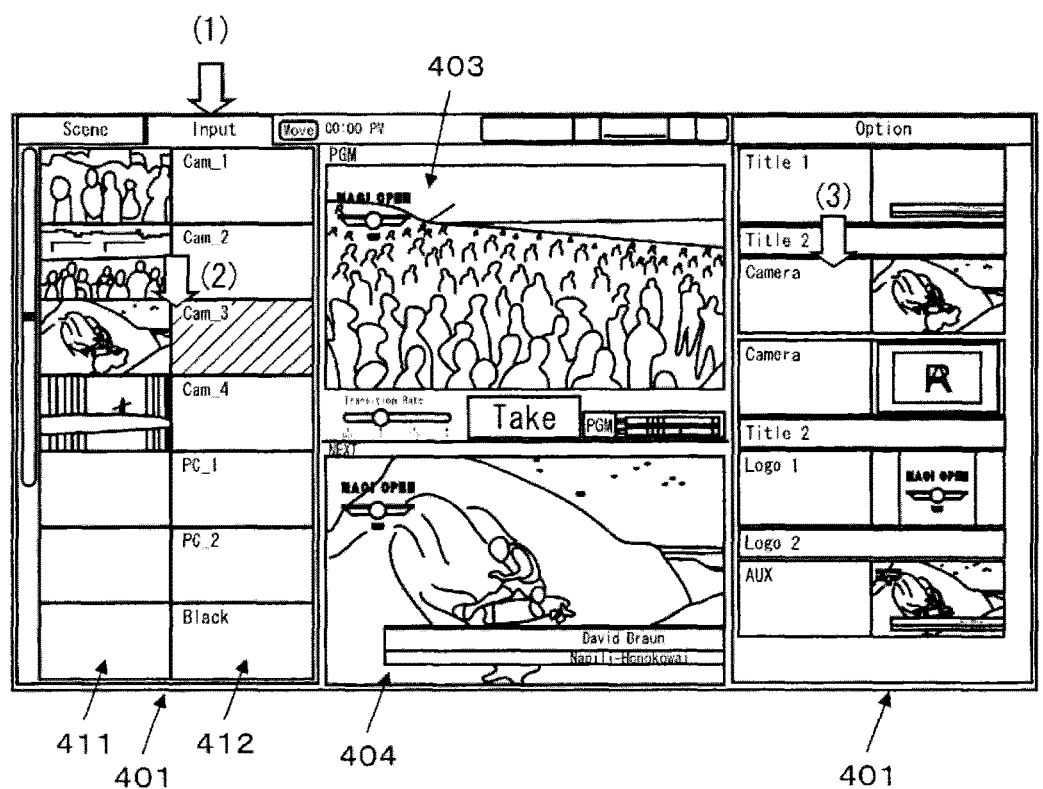
FIG. 15 is a diagram for describing a camera operation in the image processing device.

First, (1) an input (INPUT) is displayed. In this case, as illustrated in FIG. 15, performing a tap operation on the tab of an input in the main screen displays an input list on the scene/input display part 401.

Next, (2) a camera (Camera) is selected. In this case, as illustrated in FIG. 15, a predetermined camera list element is selected from the input list, and a tap operation is performed on the thumbnail display part 411 or the text display part 412. The thumbnail display part 411 of each camera list element displays an image from the camera, so that a user can check the content watching it. The image from the selected camera is displayed on the next viewer 404. The illustrated example shows that the list element of a camera "CAM 03" is selected.

Figure 16:
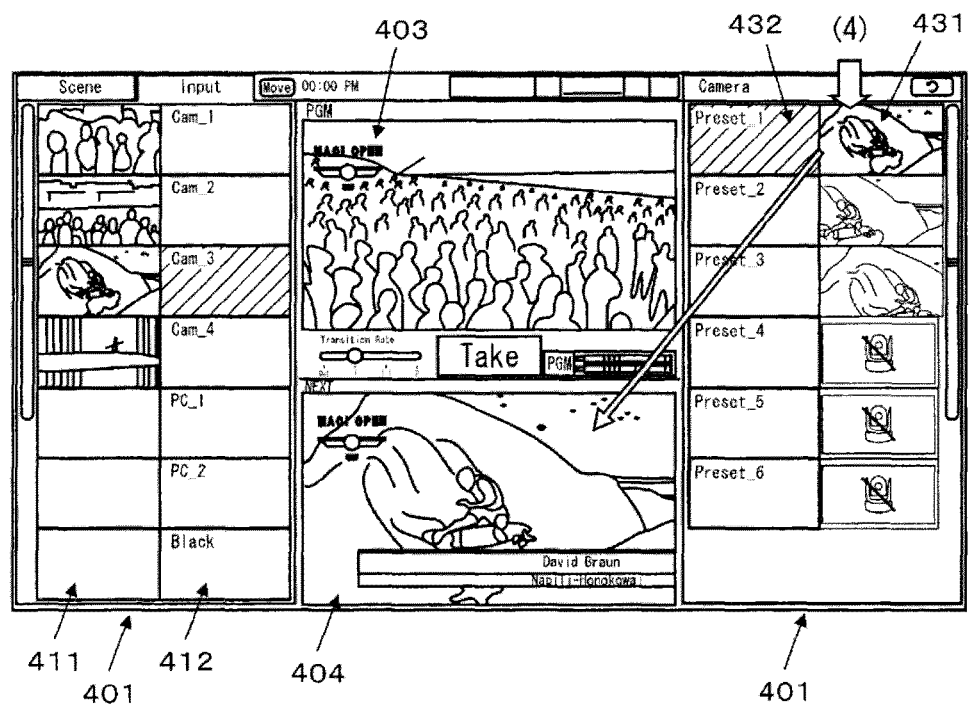
FIG. 16 is a diagram illustrating an example of a list of presets of a camera displayed on an option display part when a tap operation is performed on an option button of a camera among selection buttons of respective options on the option display part.

Next, (3) preset (Preset) display is possible. In this case, as illustrated in FIG. 15, a tap operation is performed on the option button of a camera among the selection buttons of the respective options displayed on the option display part 402 in the main screen. As illustrated in FIG. 16, this operation displays, on the option display part 402, a list of presets (Preset) of the selected camera in the above-described input list.

Next, (4) it is possible to call the preset. In this case, a predetermined preset list element is selected from the preset list, and a tap operation is performed on the thumbnail display part 431 or the text (Text) display part 432. This transmits a preset calling command to the camera, and control is exerted over the camera for directions, zoom, or the like. The example illustrated in FIG. 16 shows that the list element of a preset "Preset_1" is selected.

(5) The camera is adjusted, and it is possible to store a result of the adjustment in the preset of the camera. The sub-screen displayed on the first display device 103 displays the tab of a camera at the time at which a list element of a camera is selected from the input list displayed on the scene/input display part 401. Performing a tap operation on this tab displays a control screen of a camera on the first display device 103.

Figure 17:
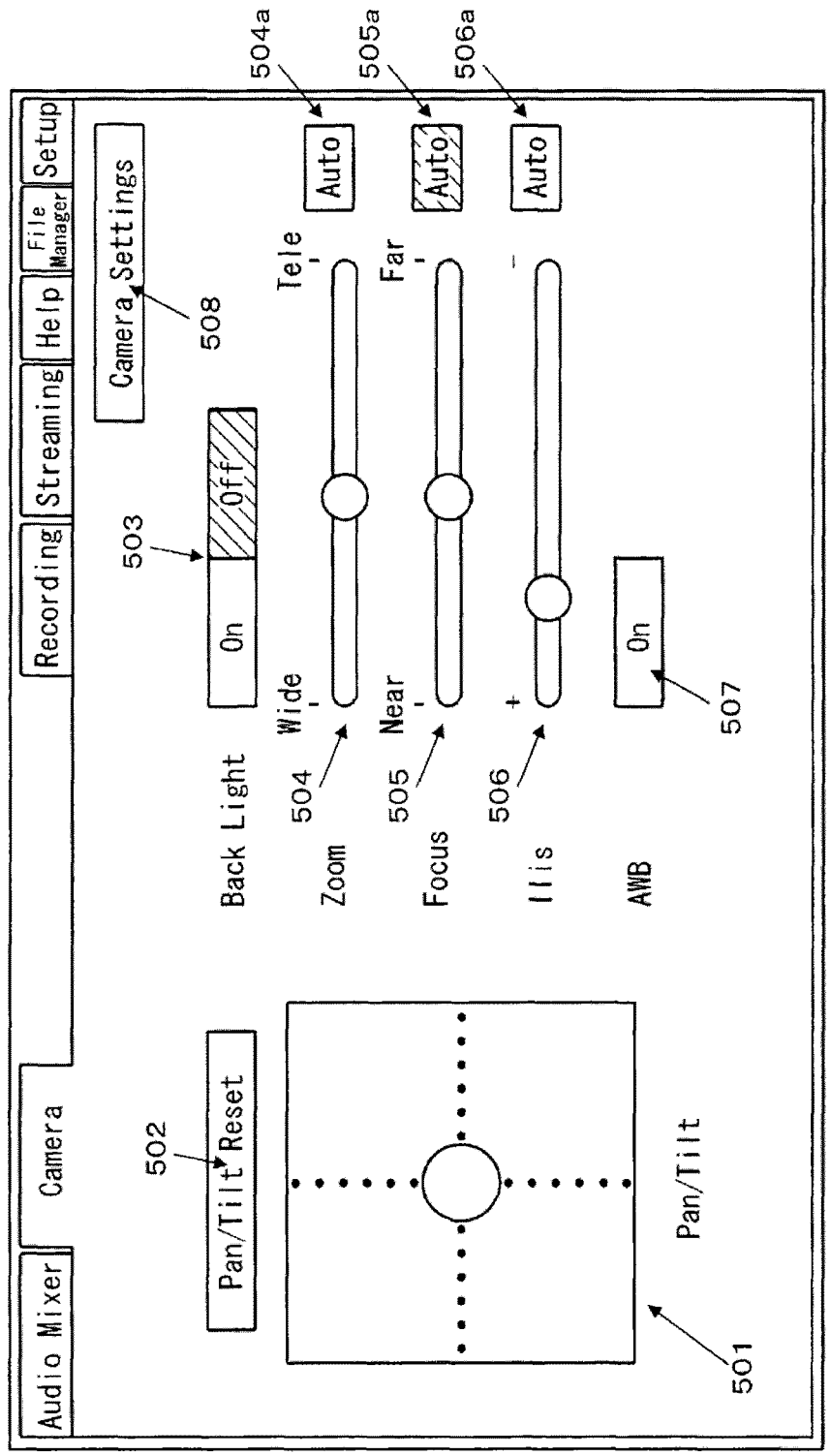
FIG. 17 is a diagram illustrating an example of a control screen of a camera displayed on the first display device as the sub-screen.

FIG. 17 illustrates an example of the control screen of a camera, which is similar to the control screen of FIG. 9(*b*). A user can manually adjust a camera by using this camera control screen. The camera control screen includes a pan/tilt (Pan/Tilt) adjustment part 501. A user can manually adjust the pan (Pan) or the transverse movement of a camera and the tilt (Tilt) or the longitudinal movement of the camera by using this pan/tilt (Pan/Tilt) adjustment part 501.

Moving a round knob (Knob) adjusts the pan and tilt. In this case, moving the knob in the horizontal direction adjusts the pan, moving the knob in the vertical direction adjusts the tilt, and further moving the knob in an oblique direction concurrently adjusts the pan and the tilt.

The camera control screen includes a reset button (Pan/Tilt Reset button) 502 of the pan/tilt (Pan/Tilt). If the pan or the tilt does not move as expected, performing a tap operation on this reset button 502 initializes the camera with a swing.

The camera control screen also includes a selection part 503 for enabling/disabling a back light correction function. Performing a tap operation on an "Off" portion selects disabling, while performing a tap operation on an "On" portion selects enabling. The illustrated example shows that disabling is selected.

The camera control screen also includes a zoom (Zoom) adjustment part 504, a focus (Focus) adjustment part 505, and an iris (Iris) adjustment part 506. Auto setting button 504*a*, 505*a*, and 506*a* are further included for the respective adjustment parts. Each adjustment part is capable of a manual adjustment only when auto setting is not enabled. Performing a tap operation on the auto setting button sets/cancels the auto setting. Moving the round knob of each adjustment part carries out an adjustment. The illustrated example shows that the auto setting is enabled for the focus adjustment unit 505 alone.

The camera control screen also includes an auto white balance adjustment button 507. Performing a tap operation on this button causes a camera to carry out an automatic adjustment of white balance. If a white portion of a camera image displayed on the next viewer 404 becomes correctly white, it is possible to check a result.

The camera control screen also includes a camera setting button 508. Performing a tap operation on this button displays a camera setting menu (not illustrated) as the sub-screen. A user can set whether to enable or disable an adjustment of the pan/tilt, whether to enable or disable an adjustment of zoom, or the like in this menu. A user is further capable of a red gain adjustment, a blue gain adjustment, and the like.

As discussed above, the camera control screen displayed on the first display device 103 allows for a manual adjustment of a camera. The image processing device 100 is further capable of a manual adjustment of a camera on the main screen displayed on the second display device 106.

Figure 18:
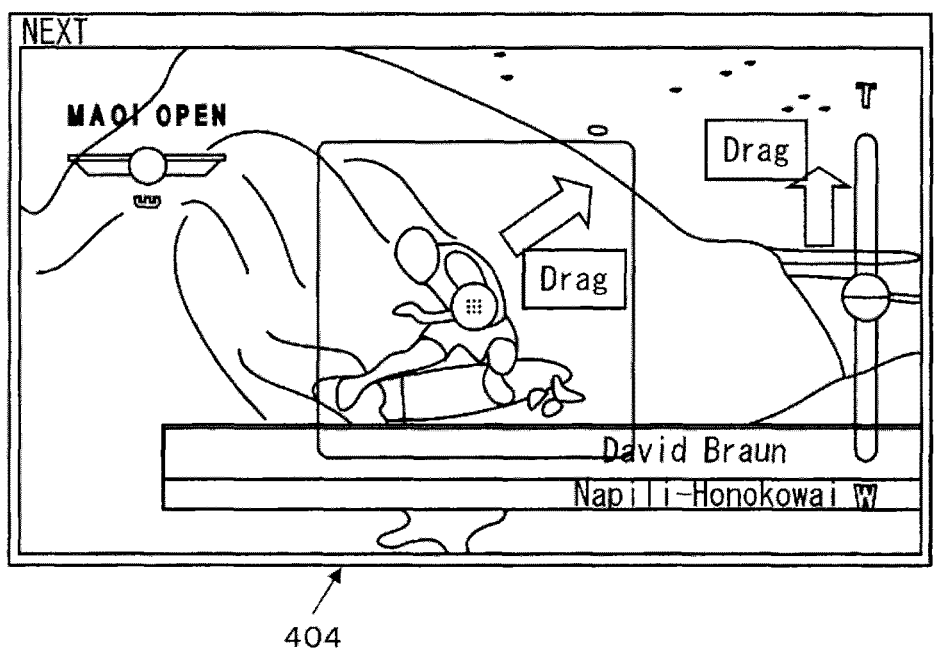
FIG. 18 is a diagram for describing a camera adjustment on the main screen displayed on the second display device.

Performing a tap operation on the next viewer 404 with an image from a camera displayed on this next viewer 404 superimposes an overlaid controller for adjusting the pan/tilt at the center of the next viewer 404, and displays a slider for a zoom adjustment at the right end of the next viewer 404 as illustrated in FIG. 18. A user can adjust the pan/tilt of a camera by performing a drag operation on the overlaid controller. A user is further capable of a zoom adjustment by performing a drag operation on the slider.

Additionally, the display of the overlaid controller and the slider displayed on the next viewer 404 are deleted by performing a tap operation on the other portions. In the direct program mode, performing a tap operation on the next viewer 404 displays the overlaid controller and the slider along with the display of "Direct Mode" (see FIG. 8), and a user can carry out an adjustment of the pan/tilt of and a zoom adjustment of a camera.

An internal storage unit of the first computer 301 of the image processing device 100 illustrated in FIGS. 1A, 1B stores a table for associating an operation on a tab and a selection button in the main screen with information for commanding a GUI configuration displayable on the first display device 103 as discussed above. When a tap operation or a GUI operation input is provided to a tab or a selection button in the main screen, the first computer 301 references the table to command the first display device 103 about a GUI configuration. Accordingly, the sub-screen displayed on the first display device 103 displays only the tab of an auxiliary screen necessary in accordance with an operation on the main screen, which allows the operability of users to be improved.

The second housing 102 of the image processing device 100 illustrated in FIGS. 1A, 1B is configured to be connected to the first housing 101 via the hinge mechanisms 200. Accordingly, the second housing 102 is overlaid on the top of the first housing 101, which accomplishes miniaturization and makes it easier to carry. When the sub-screen displayed on the display device 103 is not used, the image processing device 100 can be used with the second housing 102 laid on the top of the first housing 101 or with a spatial occupied region compressed.

The respective list elements in an input or scene list displayed on the scene/input display part 401 in the main screen are vertically arranged and displayed in the image processing device 100 illustrated in FIGS. 1A, 1B. A user can thus smoothly select each list element.

The respective selection buttons of options displayed on the option display part 402 in the main screen are vertically arranged and displayed in the image processing device 100 illustrated in FIGS. 1A, 1B. A user can thus smoothly operate each selection button.

The image processing device 100 illustrated in FIGS. 1A, 1B can display the camera control screen as the sub-screen, and can also perform camera adjustment display on the next viewer 404 for a pan/tilt adjustment. A user is thus capable of a camera adjustment with ease without turning the gaze away from an image of a camera by using the sub-screen or the main screen.

2. Modification

The second housing 102 is configured to be connected to the first housing 101 via the hinge mechanism 200, and the second housing 102 is configured to transition between the first position (closed position) and the second position (open position) in the above-described embodiment. However, of course, the present technology is also applicable to the second housing 102 fixed to the second position with respect to the first housing 101.

It is described in the above-described embodiment that the displays 302 and 303 include LCDs, but the displays 302 and 303 may include other panels such as organic EL panels.

Additionally, the present technology may also be configured as below.

(1)

An image processing device including:
a first housing;
a second housing configured to be connected to the first housing;
a first display device configured to be attached to a first surface of the first housing, the first display device being capable of a touch input;
a second display device configured to be attached to the second housing, the second display device being capable of a touch input;
a video input terminal configured to be attached to a second surface of the first housing;
a video output terminal configured to be attached to the second surface of the first housing;
a storage unit configured to retain a still image;
a video combining unit configured to use a video image from the video input terminal and the still image in the storage unit as inputs and to superimpose and combine the video image;
a configuration control unit configured to control a configuration state of an output image generated by the video combining unit to be output to the video output terminal;
a first GUI control unit configured to provide a GUI function to the first display device; and
a second GUI control unit configured to provide a GUI function to the second display device,
wherein the second housing is capable of taking a first position at which the second housing is overlaid on the first surface of the first housing and covers the first display device, and a second position at which the second housing rises from the first position and does not cover the first display device, and is capable of moving to transition between the first position and the second position,
wherein a plurality of configuration command GUI widgets are disposed and displayed on a display surface of the second display device in a manner that the plurality of configuration command GUI widgets are capable of a touch input, the plurality of configuration command GUI widgets each providing a command of the configuration state of the output image to the configuration control unit,
wherein the first GUI control unit includes a table for associating information for commanding a configuration of a GUI displayable on the first display device with a type of the configuration command GUI widget, and
wherein, when a GUI operation input is provided to the configuration command GUI widget, the first GUI control unit references the table to command the first display device about the configuration of the GUI.

(2)

The image processing device according to (1),
wherein a program image that is an image output from the video output terminal is displayed on the display surface of the second display device, and a preview image in which a configuration state of an image applicable to the program image is generated without influencing the program image is displayed, and
wherein the image processing device further includes
an image transition command button attached to the first surface of the first housing, and
a transition control unit configured to cause the program image to transition from a present configuration state to a same configuration state as a configuration state of the preview image by pressing down the image transition command button.

(3)

The image processing device according to (2),
wherein the plurality of configuration command GUI widgets each provide a command of the configuration state of the preview image to the configuration control unit.

(4)

The image processing device according to (2) or (3),
wherein an image transition command GUI widget having a same function as a function of the image transition command button is disposed and displayed on the display surface of the second display device.

(5)

The image processing device according to any of (1) to (4),
wherein the plurality of configuration command GUI widgets are vertically arranged and displayed at an end of the display surface of the second display device in a horizontal direction.

(6)

The image processing device according to any of (1) to (5),
wherein at least one of the plurality of configuration command GUI widgets has a function of providing a command of the configuration state of the output image in a manner that an image which has been associated in advance with the configuration command GUI widget is superimposed.

(7)
The image processing device according to (2), wherein a plurality of image transition type command GUI widgets for setting, before execution, content of a transition function of the program image performed by pressing down the image transition command button are disposed and displayed on the display surface of the second display device.

(8)
The image processing device according to (7), wherein a scene memory GUI widget that operates in a same way as GUI operation inputs are concurrently made to at least one of the configuration command GUI widgets and one of the image transition type command GUI widgets is disposed and displayed on the display surface of the second display device.

(9)
The image processing device according to any of (1) to (8), wherein one of GUI configurations displayable on the first display device includes a GUI for setting a gain value for superimposing an image.

(10)
The image processing device according to any of (1) to (9), wherein one of GUI configurations displayable on the first display device includes a GUI for setting a position for superimposing an image.

(11)
A GUI configuration command method for an image processing device, the image processing device including
a first housing,
a second housing configured to be connected to the first housing,
a first display device configured to be attached to a first surface of the first housing, the first display device being capable of a touch input,
a second display device configured to be attached to the second housing, the second display device being capable of a touch input,
a video input terminal configured to be attached to a second surface of the first housing,
a video output terminal configured to be attached to the second surface of the first housing,
a storage unit configured to retain still image data,
a video combining unit configured to use a video image from the video input terminal and a still image in the storage unit as inputs and to superimpose and combine the video image,
a configuration control unit configured to control a configuration state of an output image generated by the video combining unit to be output to the video output terminal,
a first GUI control unit configured to provide a GUI function to the first display device, and
a second GUI control unit configured to provide a GUI function to the second display device,
wherein, when GUI operation inputs are provided to a plurality of configuration command GUI widgets each of which is disposed and displayed on a display surface of the second display device and provides a command of configuration information on the output image to the configuration control unit, a table for associating information for commanding a configuration of a GUI displayable on the first display device with a type of the configuration command GUI widget is referenced to command a GUI configuration of the first display device.

(12)
An image processing device including:
a first housing;
a second housing configured to be connected to the first housing;
a first display device configured to be attached to a first surface of the first housing, the first display device being capable of a touch input;
a second display device configured to be attached to the second housing, the second display device being capable of a touch input;
a video input terminal configured to be attached to a second surface of the first housing; and
a video output terminal configured to be attached to the second surface of the first housing.

(13)
The image processing device according to (12), wherein the second housing is capable of taking a first position at which the second housing is overlaid on the first surface of the first housing and covers the first display device, and a second position at which the second housing rises from the first position and does not cover the first display device, and is capable of moving to transition between the first position and the second position.

(14)
The image processing device according to (12) or (13), further including:
a storage unit configured to retain still image data;
a video combining unit configured to use a video image from the video input terminal and a still image in the storage unit as inputs and to superimpose and combine the video image;
a configuration control unit configured to control a configuration state of an output image generated by the video combining unit to be output to the video output terminal;
a first GUI control unit configured to provide a GUI function to the first display device; and
a second GUI control unit configured to provide a GUI function to the second display device,
wherein a plurality of configuration command GUI widgets are disposed and displayed on a display surface of the second display device in a manner that the plurality of configuration command GUI widgets are capable of a touch input, the plurality of configuration command GUI widgets each providing a command of the configuration state of the output image to the configuration control unit,
wherein the first GUI control unit includes a table for associating information for commanding a configuration of a GUI displayable on the first display device with a type of the configuration command GUI widget, and
wherein, when a GUI operation input is provided to the configuration command GUI widget, the first GUI control unit references the table to command the first display device about the configuration of the GUI.

REFERENCE SIGNS LIST 100 image processing device
101 first housing
102 second housing
103 first display device
104 video input terminal
105 video output terminal
106 second display device 107 image transition command button (take button)
200 hinge mechanism
210 button fixation unit
220 housing abutting unit
230 command unit
240 first auxiliary unit
250 second auxiliary unit
260 arc-shaped guidance opening
301 first computer
302, 303 display
304, 305 touch input unit
306 network interface
307 input memory unit
308 control memory unit
309 intermediate memory unit
310 second computer
311 image input unit
312 image switching unit
313 image combining unit
314 image output unit
315 audio input unit
316 audio synthesizing unit
317 audio output unit
401 scene/input display part
402 object display part
403 program viewer
404 next viewer
405 transition rate
406 take button
411, 421, 431 thumbnail display part
412, 422, 433 text display part
501 pan/tilt adjustment part
502 reset button of pan/tilt
503 selection part for enabling/disabling back light correction function
504 zoom adjustment part
504a, 505a, 506a auto setting button
505 focus adjustment part
506 iris adjustment part
507 auto white balance adjustment button
508 camera setting button

The invention claimed is:

1. An image processing device comprising:
a first housing;
a second housing configured to be connected to the first housing;
a first display device configured to be attached to a first surface of the first housing, the first display device being capable of a touch input;
a second display device configured to be attached to the second housing, the second display device being capable of a touch input;
a video input terminal configured to be attached to a second surface of the first housing;
a video output terminal configured to be attached to the second surface of the first housing;
a memory configured to retain a still image; and
circuitry configured to
use a video image from the video input terminal and the still image in the memory as inputs and to superimpose and combine the video image;
control a configuration state the combined video image to be output to the video output terminal;
provide a GUI function to the first display device; and
provide a GUI function to the second display device, wherein
the second housing is capable of taking a first position at which the second housing is overlaid on the first surface of the first housing and covers the first display device, and a second position at which the second housing rises from the first position and does not cover the first display device, and is capable of moving to transition between the first position and the second position,
a plurality of configuration command GUI widgets are disposed and displayed on a display surface of the second display device in a manner that the plurality of configuration command GUI widgets are capable of a touch input, the plurality of configuration command GUI widgets each providing a command of the configuration state of the combined video image to the circuitry,
the circuitry includes a table for associating information for commanding a configuration of a GUI displayable on the first display device with a type of the configuration command GUI widget, and
when a GUI operation input is provided to the configuration command GUI widget, the circuitry references the table to command the first display device about the configuration of the GUI.

2. The image processing device according to claim 1, wherein
a program image that is an image output from the video output terminal is displayed on the display surface of the second display device, and a preview image in which a configuration state of an image applicable to the program image is generated without influencing the program image is displayed,
the image processing device further includes an image transition command button attached to the first surface of the first housing, and
the circuitry is configured to cause the program image to transition from a present configuration state to a same configuration state as a configuration state of the preview image by pressing down the image transition command button.

3. The image processing device according to claim 2, wherein
the plurality of configuration command GUI widgets each provide a command of the configuration state of the preview image to the circuitry.

4. The image processing device according to claim 2, wherein
an image transition command GUI widget having a same function as a function of the image transition command button is disposed and displayed on the display surface of the second display device.

5. The image processing device according to claim 1, wherein
the plurality of configuration command GUI widgets are vertically arranged and displayed at an end of the display surface of the second display device in a horizontal direction.

6. The image processing device according to claim 1, wherein
at least one of the plurality of configuration command GUI widgets has a function of providing a command of the configuration state of the combined video image in a manner that an image which has been associated in advance with the configuration command GUI widget is superimposed.

7. The image processing device according to claim 2, wherein
a plurality of image transition type command GUI widgets for setting, before execution, content of a transition function of the program image performed by pressing down the image transition command button are disposed and displayed on the display surface of the second display device.

8. The image processing device according to claim 7, wherein
a scene memory GUI widget that operates in a same way as GUI operation inputs are concurrently made to at least one of the configuration command GUI widgets and one of the image transition type command GUI widgets is disposed and displayed on the display surface of the second display device.

9. The image processing device according to claim 1, wherein
one of GUI configurations displayable on the first display device includes a GUI for setting a gain value for superimposing an image.

10. The image processing device according to claim 1, wherein
one of GUI configurations displayable on the first display device includes a GUI for setting a position for superimposing an image.

11. A GUI configuration command method for an image processing device, the image processing device including a first housing, a second housing configured to be connected to the first housing, a first display device configured to be attached to a first surface of the first housing, the first display device being capable of a touch input, a second display device configured to be attached to the second housing, the second display device being capable of a touch input, a video input terminal configured to be attached to a second surface of the first housing, a video output terminal configured to be attached to the second surface of the first housing, and a memory configured to retain still image data, the method comprising:
using a video image from the video input terminal and a still image in the memory as inputs and to superimpose and combine the video image;
controlling a configuration state of the combined video image to be output to the video output terminal,
providing a GUI function to the first display device; and
providing a GUI function to the second display device, wherein
when GUI operation inputs are provided to a plurality of configuration command GUI widgets each of which is disposed and displayed on a display surface of the second display device and a command of configuration information on the combined video image is provided, a table for associating information for commanding a configuration of a GUI displayable on the first display device with a type of the configuration command GUI widget is referenced to command a GUI configuration of the first display device.

12. An image processing device comprising:
a first housing;
a second housing configured to be connected to the first housing;
a first display device configured to be attached to a first surface of the first housing, the first display device being capable of a touch input;
a second display device configured to be attached to the second housing, the second display device being capable of a touch input;
a video input terminal configured to be attached to a second surface of the first housing;
a video output terminal configured to be attached to the second surface of the first housing;
a memory configured to retain still image data; and
circuitry configured to
superimpose and combine a video image from the video input terminal and a still image in the memory to create an output image;
control a configuration state of the output image to be output to the video output terminal;
provide a GUI function to the first display device; and
provide a GUI function to the second display device, wherein
a plurality of configuration command GUI widgets are disposed and displayed on a display surface of the second display device in a manner that the plurality of configuration command GUI widgets are capable of a touch input, the plurality of configuration command GUI widgets each providing a command of the configuration state of the output image to the circuitry,
the circuitry includes a table for associating information for commanding a configuration of a GUI displayable on the first display device with a type of the configuration command GUI widget, and
when a GUI operation input is provided to the configuration command GUI widget, the circuitry references the table to command the first display device about the configuration of the GUI.

13. The image processing device according to claim 12, wherein
the second housing is capable of taking a first position at which the second housing is overlaid on the first surface of the first housing and covers the first display device, and a second position at which the second housing rises from the first position and does not cover the first display device, and is capable of moving to transition between the first position and the second position.

* * * * *